(12) United States Patent
Morita

(10) Patent No.: US 11,825,393 B2
(45) Date of Patent: Nov. 21, 2023

(54) IMAGE FORMING APPARATUS THAT PERFORMS HANDOVER, METHOD OF CONTROLLING THE SAME, AND STORAGE MEDIUM

(71) Applicant: CANON KABUSHIKI KAISHA, Tokyo (JP)

(72) Inventor: Naoki Morita, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/517,860

(22) Filed: Nov. 3, 2021

(65) Prior Publication Data

US 2022/0060874 A1 Feb. 24, 2022

Related U.S. Application Data

(63) Continuation of application No. 16/846,881, filed on Apr. 13, 2020, now Pat. No. 11,190,921, which is a continuation of application No. 16/245,530, filed on Jan. 11, 2019, now Pat. No. 10,659,942, which is a continuation of application No. 14/938,127, filed on Nov. 11, 2015, now Pat. No. 10,225,715.

(30) Foreign Application Priority Data

Nov. 17, 2014 (JP) .................................. 2014-232939

(51) Int. Cl.
*H04W 4/80* (2018.01)
*H04W 84/12* (2009.01)

(52) U.S. Cl.
CPC .............. *H04W 4/80* (2018.02); *H04W 84/12* (2013.01)

(58) Field of Classification Search
CPC ................... H04W 4/80; H04W 84/12; G05B 2219/31165; H04B 7/18541
See application file for complete search history.

(56) References Cited

U.S. PATENT DOCUMENTS

| 9,042,940 B2 | 5/2015 | Suzuki |
| 9,094,780 B2 | 7/2015 | Naruse |

(Continued)

FOREIGN PATENT DOCUMENTS

| JP | 2009211644 A | 9/2009 |
| JP | 2013187568 A | 9/2013 |

(Continued)

OTHER PUBLICATIONS

Office Action issued in Japanese Patent Application No. 2014-232939 dated Apr. 28, 2017.

(Continued)

*Primary Examiner* — Iriana Cruz
(74) *Attorney, Agent, or Firm* — ROSSI, KIMMS & McDOWELL LLP

(57) ABSTRACT

The present image forming apparatus selects an appropriate connection method in accordance with circumstances from a plurality of connection methods when communication with an information processing apparatus is established by short-range wireless communication, and notifies information necessary for performing communication by the selected connection method to the information processing apparatus via short-range wireless communication.

27 Claims, 18 Drawing Sheets

(56) References Cited

U.S. PATENT DOCUMENTS

| | | | |
|---|---|---|---|
| 2005/0130647 A1* | 6/2005 | Matsuda | G06F 3/1203 455/426.2 |
| 2011/0312278 A1* | 12/2011 | Matsushita | H04W 4/80 455/66.1 |
| 2012/0208461 A1* | 8/2012 | Choi | H04B 5/0062 455/41.2 |
| 2013/0231051 A1* | 9/2013 | Naruse | G06F 3/126 455/41.2 |
| 2013/0260819 A1 | 10/2013 | Suzuki | |
| 2014/0028818 A1 | 1/2014 | Brockway, III | |
| 2014/0085666 A1 | 3/2014 | Park | |
| 2014/0293333 A1 | 10/2014 | Asai | |
| 2014/0342665 A1 | 11/2014 | Amano | |
| 2014/0355057 A1 | 12/2014 | Jang | |
| 2015/0092764 A1 | 4/2015 | Hirose | |
| 2015/0093992 A1 | 4/2015 | Tanaka | |
| 2015/0382136 A1 | 12/2015 | Mihira | |
| 2016/0014660 A1 | 1/2016 | Bar | |
| 2016/0072553 A1* | 3/2016 | Tanji | H04M 1/72412 455/41.1 |

FOREIGN PATENT DOCUMENTS

| | | |
|---|---|---|
| JP | 2013214801 A | 10/2013 |
| JP | 2014183445 A | 9/2014 |

OTHER PUBLICATIONS

Office Action issued in Korean Application No. 10-2015-0156340 dated Jan. 11, 2018.
Office Action issued in U.S. Appl. No. 14/938,127 dated Apr. 22, 2016.
Office Action issued in U.S. Appl. No. 14/938,127 dated Nov. 3, 2016.
Office Action issued in U.S. Appl. No. 14/938,127 dated Feb. 8, 2017.
Office Action issued in U.S. Appl. No. 14/938,127 dated Aug. 21, 2017.
Office Action issued in U.S. Appl. No. 14/938,127 dated Apr. 2, 2018.
Notice of Allowance issued in U.S. Appl. No. 14/938,127 dated Oct. 12, 2018.
Office Action issued in U.S. Appl. No. 16/245,530 dated Jun. 27, 2019.
Notice of Allowance issued in U.S. Appl. No. 16/245,530 dated Jan. 13, 2020.
Office Action issued in U.S. Appl. No. 16/846,881 dated Dec. 23, 2020.
Notice of Allowance issued in U.S. Appl. No. 16/846,881 dated Jul. 30, 2021.

* cited by examiner

| USER NAME | PRIVILEGE TO ACCESS NETWORK |
|---|---|
| USER NAME A | YES |
| USER NAME B | NO |

F I G. 11
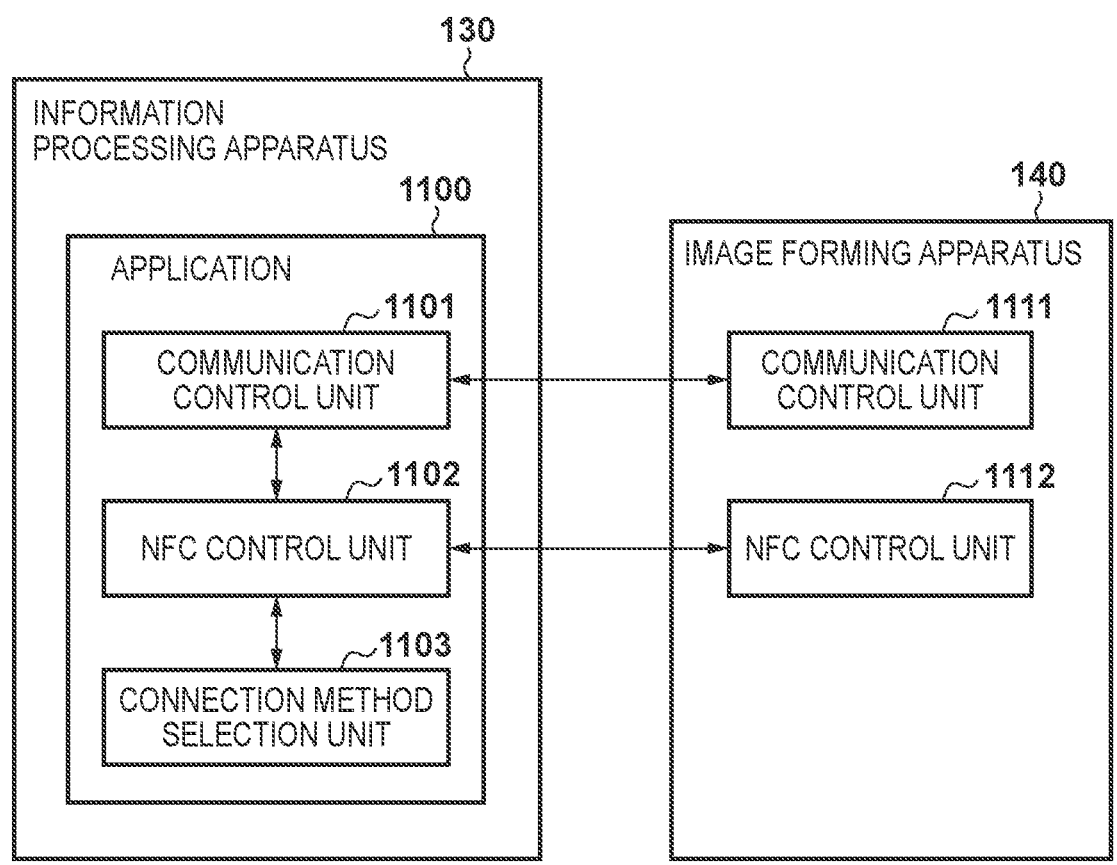

F I G. 14
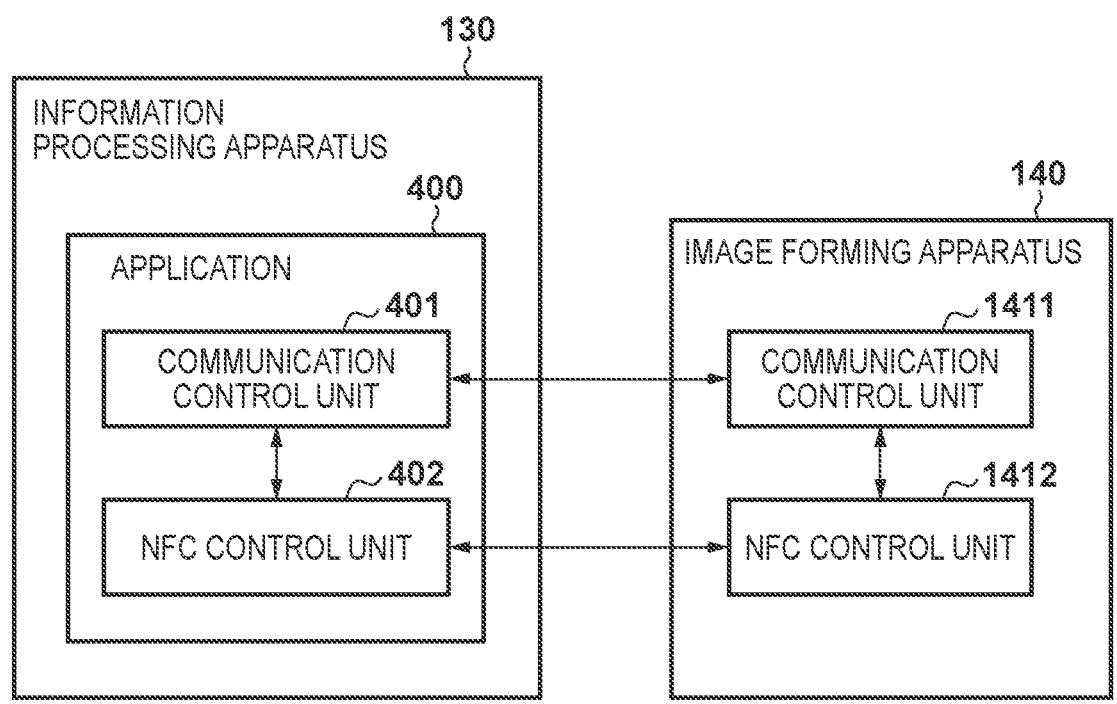

IMAGE FORMING APPARATUS THAT PERFORMS HANDOVER, METHOD OF CONTROLLING THE SAME, AND STORAGE MEDIUM

BACKGROUND OF THE INVENTION

Field of the Invention

The present invention relates to a communication image forming apparatus comprising a short-range wireless communication function, a method of controlling the same, and a storage medium.

Description of the Related Art

In recent years, NFC (Near Field Communication), which is one type of short-range wireless communication (non-contact communication) is spreading in various fields. NFC has a very short communication range; when devices that perform communication approach within a few cm of each other, a wireless link is connected, and the wireless link is disconnected when they move apart. In this way, for devices in which NFC is installed, it is possible to perform communication by causing them to approach each other. For this reason, NFC can provide a convenient method for a user to simply use various services, and is attracting attention and being put to practical use in various fields.

As a technique in which NFC is used, there is a technique in which communication is performed by just performing pairing between information processing apparatuses by NFC, and subsequently switching (performing a handover) to another connection method (BlueTooth (registered trademark), WiFi-Direct, a wireless LAN). As a usage approach for such a handover, a method in which, in order for a user holding a mobile communication terminal to perform communication with an MFP (Multi-Function Printer) in front of the user, pairing between the mobile communication terminal and the MFP is performed by NFC, and then communication is performed via a wireless LAN is known.

However, a case in which the MFP detected by NFC cannot communicate with the mobile communication terminal by the wireless LAN for a reason of not being connected to a network or the like can be considered. Japanese Patent Laid-Open No. 2013-187568 proposes that a mobile communication terminal list MFPs that can communicate by a wireless LAN, and if there is an MFP detected by NFC in the list, perform communication with the MFP via the wireless LAN, and if there is no MFP detected by NFC in the list, perform control to not perform a handover.

However, there is a problem with the above described conventional technique as recited below. In the above described conventional technique, when the MFP and the mobile communication terminal perform a handover, the MFP uses one connection method that it supports as the connection method to hand over communication from NFC to. However, there exist circumstances in which connection methods cannot be used in communication with the mobile communication terminal. For example, a wireless LAN cannot be used when the mobile communication terminal does not have authorization to access a network that the MFP is connected to. Accordingly, a method that selects a connection method to which to hand over communication by the handover so as to be able to use a connection method suited to the circumstances is required.

SUMMARY OF THE INVENTION

The present invention enables realization of an arrangement of suitably selecting a connection method that switches from short-range wireless communication in accordance with circumstances of a connecting apparatus.

One aspect of the present invention provides an image forming apparatus, comprising: a short-range wireless communication unit configured to execute short-range wireless communication; a wireless communication unit operable in a first wireless communication mode in which the image forming apparatus connects to an external access point, and a second wireless communication mode in which the image forming apparatus operates as an access point; a setting unit configured to set whether to write first connection information corresponding to the first wireless communication mode or second connection information corresponding to the second wireless communication mode to the short-range wireless communication unit in accordance with a user instruction; and a writing unit configured to write one of the first connection information and the second connection information to the short-range wireless communication unit in accordance with the setting by the setting unit.

Another aspect of the present invention provides an image forming apparatus, comprising: a short-range wireless communication unit configured to execute short-range wireless communication; a wireless communication unit operable in a first wireless communication mode in which the image forming apparatus connects to an external access point, and a second wireless communication mode in which the image forming apparatus operates as an access point; a selection unit configured to select either first connection information corresponding to the first wireless communication mode or second connection information corresponding to the second wireless communication mode based on user information of a user that uses the image forming apparatus; and a writing unit configured to write the connection information selected by the selection unit to the short-range wireless communication unit.

Still another aspect of the present invention provides a method for controlling an image forming apparatus comprising a short-range wireless communication unit configured to execute short-range wireless communication and a wireless communication unit operable in a first wireless communication mode in which the image forming apparatus connects to an external access point and a second wireless communication mode in which the image forming apparatus operates as an access point, the method comprising: setting whether to write first connection information corresponding to the first wireless communication mode or second connection information corresponding to the second wireless communication mode to the short-range wireless communication unit in accordance with a user instruction; and writing one of the first connection information and the second connection information to the short-range wireless communication unit in accordance with the setting.

Yet still another aspect of the present invention provides a non-transitory computer-readable storage medium storing a computer program for causing a computer to execute a method for controlling an image forming apparatus comprising a short-range wireless communication unit configured to execute short-range wireless communication and a wireless communication unit operable in a first wireless communication mode in which the image forming apparatus connects to an external access point and a second wireless communication mode in which the image forming apparatus operates as an access point, the method comprising: setting whether to write first connection information corresponding to the first wireless communication mode or second connection information corresponding to the second wireless communication mode to the short-range wireless communication unit in accordance with a user instruction; and writing one of the first connection information and the second connection information to the short-range wireless communication unit in accordance with the setting.

Still yet another aspect of the present invention provides a method for controlling an image forming apparatus comprising a short-range wireless communication unit configured to execute short-range wireless communication and a wireless communication unit operable in a first wireless communication mode in which the image forming apparatus connects to an external access point and a second wireless communication mode in which the image forming apparatus operates as an access point, the method comprising: selecting either first connection information corresponding to the first wireless communication mode or second connection information corresponding to the second wireless communication mode based on user information of a user that uses the image forming apparatus; and writing the selected connection information to the short-range wireless communication unit.

Yet still another aspect of the present invention provides a non-transitory computer-readable storage medium storing a computer program for causing a computer to execute a method for controlling an image forming apparatus comprising a short-range wireless communication unit configured to execute short-range wireless communication and a wireless communication unit operable in a first wireless communication mode in which the image forming apparatus connects to an external access point and a second wireless communication mode in which the image forming apparatus operates as an access point, the method comprising: selecting either first connection information corresponding to the first wireless communication mode or second connection information corresponding to the second wireless communication mode based on user information of a user that uses the image forming apparatus; and writing the selected connection information to the short-range wireless communication unit.

Further features of the present invention will be apparent from the following description of exemplary embodiments with reference to the attached drawings.

BRIEF DESCRIPTION OF THE DRAWINGS

FIG. 11 is a block diagram for illustrating a software configuration of the communication system 100 according to a third embodiment.

FIG. 14 is a block diagram for illustrating a software configuration of the communication system 100 according to the fourth embodiment.

DESCRIPTION OF THE EMBODIMENTS

Figure 1:
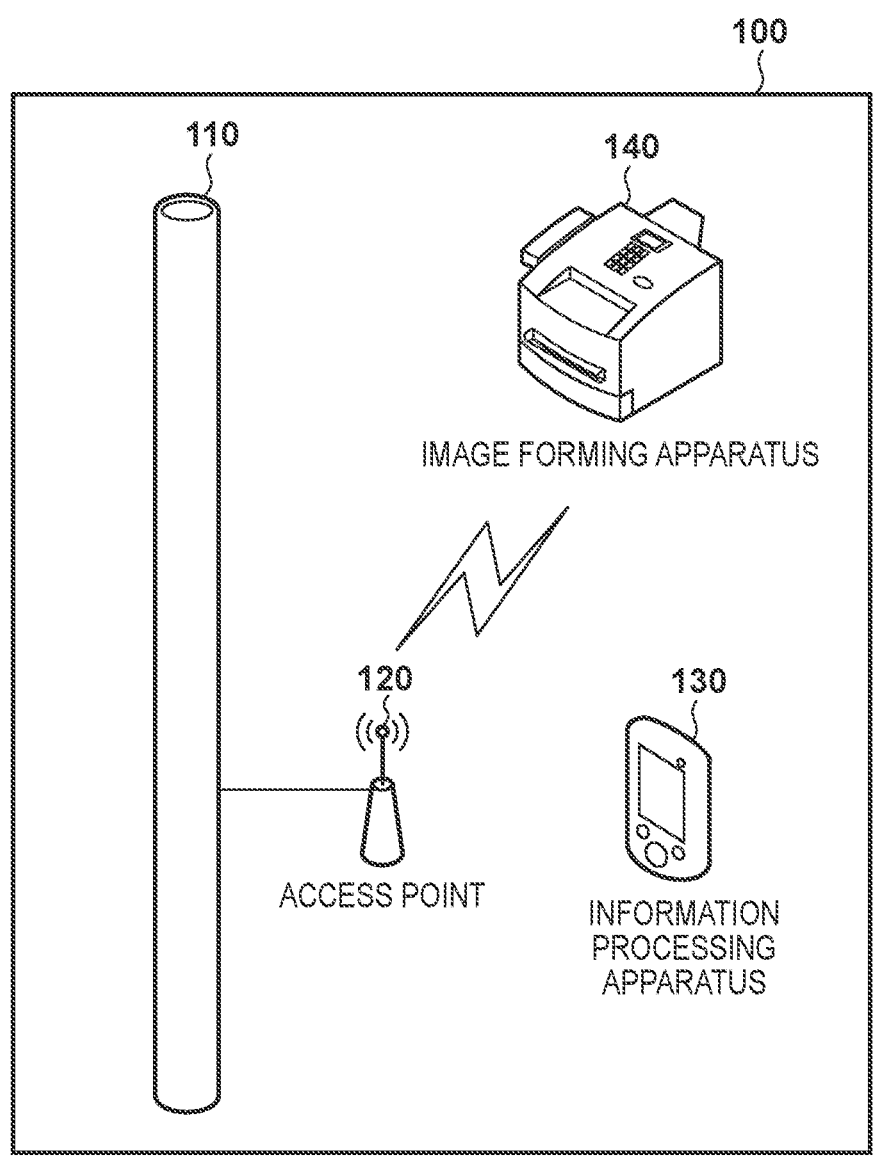
FIG. 1 is a schematic view that illustrates a communication system 100 according to a first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<System Configuration>

Below, with reference to FIG. 1 through FIG. 7, FIG. 18 and FIG. 19, explanation is given for a first embodiment of the present invention. Firstly, referring to FIG. 1, explanation is given for a configuration of a communication system according to the present embodiment.

Reference numeral 100 in the drawing is a communication system, which is comprised of a network 110, an access point 120, an information processing apparatus 130, and an image forming apparatus 140. In the present embodiment, the information processing apparatus 130 is envisioned to be a mobile communication terminal such as a smart phone. In the present embodiment, the image forming apparatus 140 is envisioned to be an MFP (Multi-Function Printer), and is connected to the network 110 via the access point 120. Note that, the present invention is not limited to the configuration in the figure in regards to the system configuration of a number or the like of the information processing apparatus, image forming apparatus or the access point, and may be appropriately changed in a scope in which the spirit of the present invention is not impaired. In addition, the information processing apparatus 130 and the image forming apparatus 140 can perform short-range wireless communication with each other, and this communication is established when the information processing apparatus 130 is positioned in the neighborhood of the image forming apparatus 140.

<Information Processing Apparatus Hardware Configuration>

Figure 2:
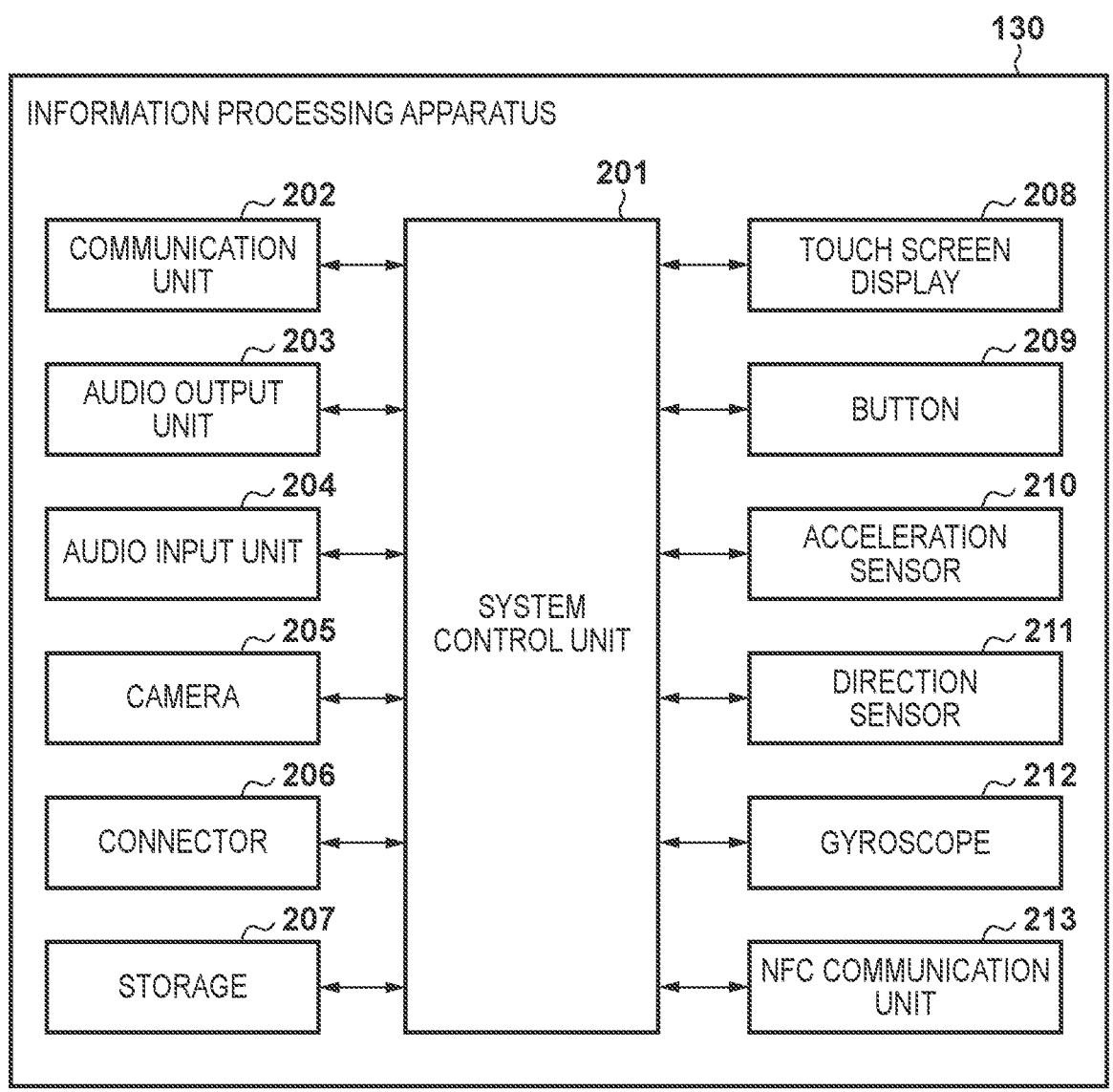
FIG. 2 is a block diagram for illustrating a hardware configuration of an information processing apparatus 130 according to the first embodiment.

Next, FIG. 2 will give an explanation for a hardware configuration of the information processing apparatus 130 according to the first embodiment. Note that the configuration of the information processing apparatus 130 explained below is only one example, and changes may be made as appropriate in a scope in which the spirit of the present invention is not impaired.

The information processing apparatus 130 comprises a system control unit 201, a communication unit 202, an audio output unit 203, an audio input unit 204, a camera 205, a connector 206, and a storage 207. Furthermore, the information processing apparatus 130 comprises a touch screen display 208, buttons 209, an accelerometer 210, a direction sensor 211, a gyroscope 212, and an NFC communication unit 213.

The touch screen display 208 displays text, images, and graphics such as diagrams, and detects a user operation (a tap, flick or the like by a finger or a stylus pen) performed with respect to the screen. The buttons 209 comprises a plurality of buttons that are operated by a user. The system control unit 201 detects operations (a click, a double-click, a push, or the like) on buttons by cooperating with the buttons 209. For example, for buttons, there is a home button, a power ON/OFF button, a volume button, or the like.

The communication unit 202 is a module that performs communication. A communication scheme performed by the communication unit 202 is in accordance with a wireless communication standard. For example, as wireless communication standards, there are 2G, 3G, or 4G mobile wireless communication standards. BlueTooth, WiFi (IEEE 802.11), WiMAX, or the like, are other wireless communication standards. The communication unit 202 can support a connection method of one or more of the above-described communication standards. In the present embodiment, the communication unit 202 supports a mobile wireless communication standard and WiFi.

The NFC communication unit 213 generates an electromagnetic field that is capable of communication only at a short distance, and allows short-range wireless communication between devices equipped with NFC (Near Field Communication). In the present embodiment, this is an IC tag that supports NFC. The audio output unit 203 outputs an audio signal transmitted from the system control unit 201 as audio. The audio input unit 204 converts audio of a user into an audio signal, and transmits it to the system control unit 201.

The storage 207 stores a program and data. For example, it stores a control program, an application, and setting data. The storage 207 is also used as a work area that temporarily stores a result of processing of the system control unit 201. The storage 207 may include a storage device such as a semiconductor storage device or a magnetic storage device. The storage 207 may also include a plurality of types of storage devices. The storage 207 may also combine a portable storage medium, such as a memory card, and an apparatus for reading the storage medium. Programs stored in the storage 207 include an application executed in a foreground or a background, and a control program that supports an operation of an application. For example, applications cause predetermined screens to be displayed on the touch screen display 208, and cause processing to be executed by the system control unit 201 in accordance with user operations detected by the touch screen display 208.

The control program is, for example, an OS. The applications and the control program are installed on the storage 207 via wireless communication by the communication unit 202. The control program provides functions relating to various control for causing the information processing apparatus 130 to operate. For example, the control program realizes making a call by controlling the communication unit 202, the audio output unit 203, the audio input unit 204, or the like.

The system control unit 201 is, for example, a CPU (Central Processing Unit). The system control unit 201 may be an integrated circuit such as an SoC (System-on-a-chip) in which other components, such as the communication unit 202, are integrated. The system control unit 201 comprehensively controls operation of the information processing apparatus 130, and realizes various functions. More specifically, the system control unit 201 executes an instruction included in a program stored on the storage 207, while referring to data stored on the storage 207 as necessary. The system control unit 201 realizes the various functions by controlling the touch screen display 208, the communication unit 202, or the like. The system control unit 201 may change control in accordance with a result of detection of various detection units such as the touch screen display 208, the buttons 209, the accelerometer 210, or the like. The system control unit 201 performs reading/writing with respect to the NFC communication unit 213.

The camera 205 is an out-camera that captures an object. The connector 206 is a terminal to which another apparatus is connected. The connector 206 may be a general-purpose terminal, such as a USB (Universal Serial Bus), HDMI (registered trademark) (High-Definition Multimedia Interface), Light Peak (Thunderbolt), or an earphone/microphone connector. The connector 206 may be an exclusively designed terminal, such as a dock connector. Apparatuses that are connected to the connector 206 for example include an external storage, a speaker, and a communication apparatus.

The accelerometer 210 detects a direction and a magnitude of an acceleration that acts on the information processing apparatus 130. The direction sensor 211 detects an orientation of geomagnetism. The gyroscope 212 detects a rotation of the information processing apparatus 130. Results of detection of the accelerometer 210, the direction sensor 211, and the gyroscope 212 are used in combination to detect a change in position and orientation of the information processing apparatus 130.

<Image Forming Apparatus Hardware Configuration>

Figure 3:
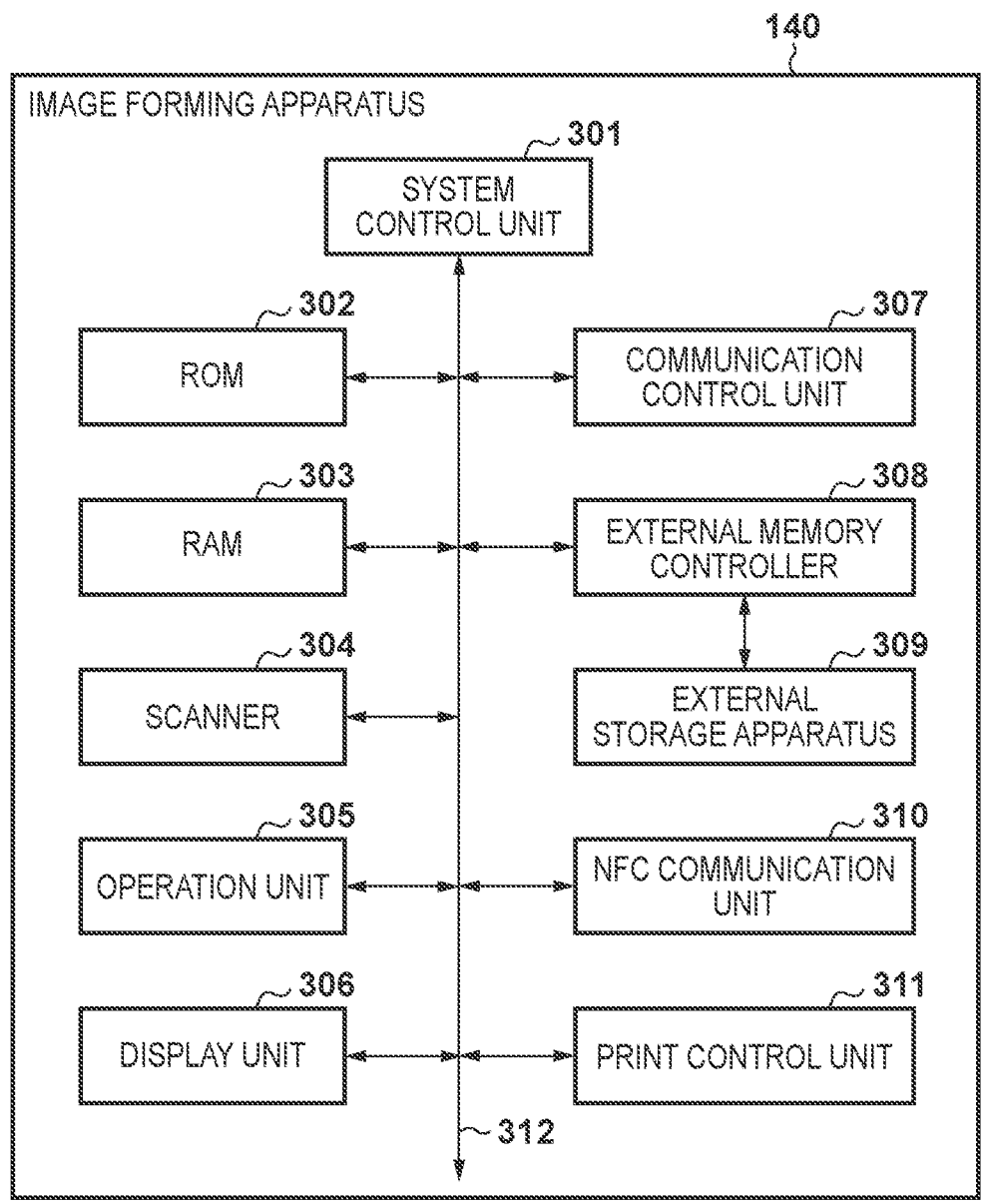
FIG. 3 is a block diagram for illustrating a hardware configuration of an image forming apparatus 140 according to the first embodiment.

Next, with reference to FIG. 3, explanation is given for a hardware configuration of the image forming apparatus 140 according to the present embodiment. Note that the configuration of the image forming apparatus 140 explained below is only one example, and changes may be made as appropriate in a scope in which the spirit of the present invention is not impaired.

The image forming apparatus 140 comprises a system control unit 301, a ROM 302, a RAM 303, a scanner 304, an operation unit 305, a display unit 306, and a communication control unit 307. Furthermore, the image forming apparatus 140 comprises an external memory controller 308, an external storage apparatus 309, an NFC communication unit 310, a print control unit 311, and a system bus 312.

The system control unit 301 is a processing apparatus, such as a CPU, and has a function of executing various processes that the image forming apparatus 140 performs. The ROM 302 is a nonvolatile storage device, in which various control programs of the image forming apparatus 140 and initial setting values are stored. In the present embodiment, software that the image forming apparatus 140 has is stored on the ROM 302, and as necessary is stored in the RAM 303 and then executed. The RAM 303 is a volatile storage device, and is used as a work area for the various processes that the image forming apparatus 140 performs. In the present embodiment, software that the image forming apparatus 140 has is stored in the RAM 303 and then executed.

The scanner 304 is an image reading unit for reading an image printed on paper (a recording medium). In many cases, an automatic document feeder is attached to the scanner 304 as an option, and it is possible to automatically read a plurality of original pages. The operation unit 305 is an input apparatus such as a button, and the system control unit 301 continuously monitors its input state. The display unit 306 is a display apparatus such as an LED or an LCD, and performs display in accordance with control by the system control unit 301.

The communication control unit 307 is a connector for USB, a network, or the like, and a control apparatus therefor, and performs control of input and output with respect to an external unit in accordance with control from the system control unit 301. In the present embodiment, the communication control unit 307 supports USB communication and network communication, such as a wired/wireless LAN, WiFi-Direct (a standard in which a WiFi device itself can perform the role of an access point), or the like. The external memory controller 308 performs control of input and output or the like with respect to the external storage apparatus 309, which is a hard disk or the like. The NFC communication unit 310 generates an electromagnetic field by which communication is possible at a short distance, and enables short-range wireless communication between devices that are NFC equipped. In the present embodiment, this is an RFID reader/writer.

The print control unit 311 comprises apparatuses for actually printing an image to a sheet, such as a fixing device system, a laser beam control system, and a paper conveyance system (not shown); a detection apparatus that detects printing success, an occurrence of an error, or the like; and a serial communication apparatus for communicating with the system control unit 301. The system bus 312 is a bus to which the previously described system control unit 301, ROM 302, RAM 303, scanner 304, operation unit 305, display unit 306, communication control unit 307, external memory controller 308, NFC communication unit 310, and the print control unit 311 are attached.

<Software Configuration>

Figure 4:
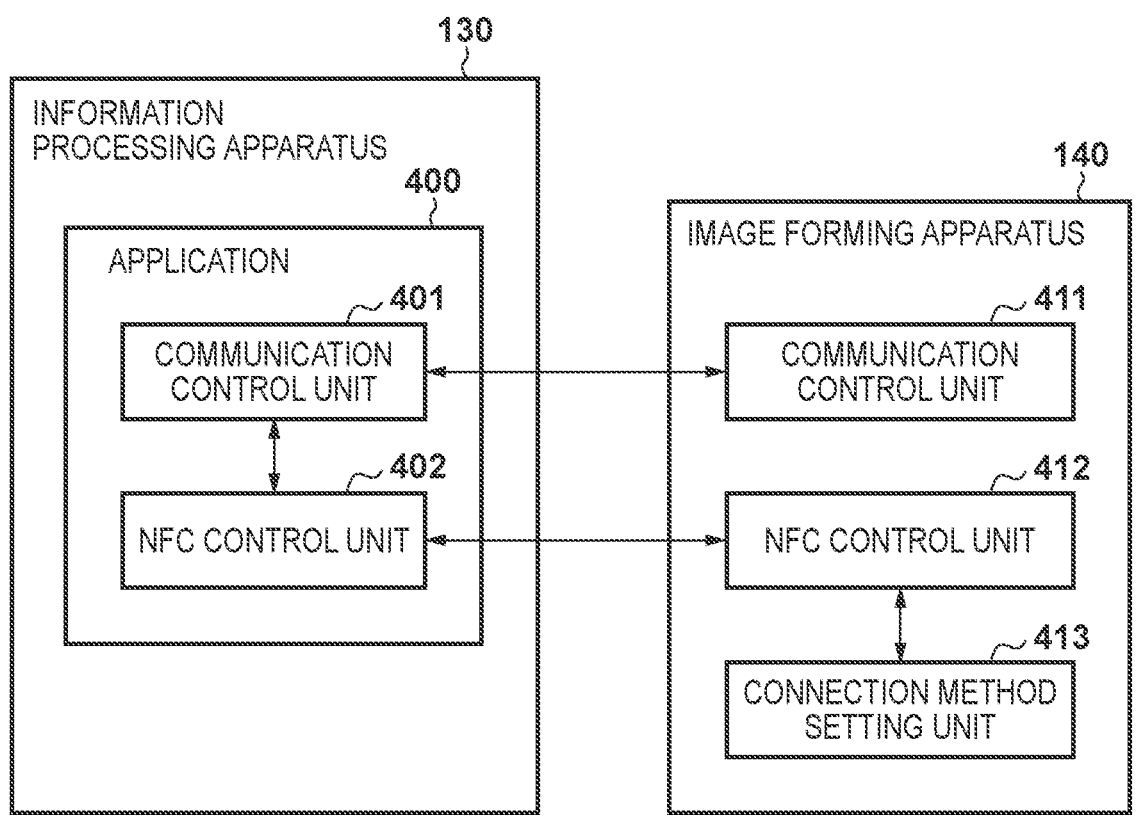
FIG. 4 is a block diagram for illustrating a software configuration of the communication system 100 according to the first embodiment.

Next, with reference to FIG. 4, explanation is given for a configuration of software of the communication system 100 according to the present embodiment. Note that the software configuration explained below is only one example, and changes may be made as appropriate in a scope in which the spirit of the present invention is not impaired.

The information processing apparatus 130 has an application 400. The application 400 is stored in the storage 207, and is executed by the system control unit 201 as necessary. The application 400 is comprised by a communication control unit 401 and an NFC control unit 402. The NFC control unit 402 uses the NFC communication unit 213 to perform communication with the NFC communication unit 310 of the image forming apparatus 140. In the present embodiment, the NFC control unit 402 obtains information (hereinafter, referred to as connection information) necessary for switching communication by a handover by performing communication with the NFC communication unit 310. The communication control unit 401 performs communication, via the communication unit 202, with a communication control unit 411 of the image forming apparatus 140, based on the connection information that the NFC control unit 402 obtained.

The image forming apparatus 140 comprises the communication control unit 411, a NFC control unit 412, and a connection method setting unit 413. The communication control unit 411 performs communication with the communication control unit 401 via the communication control unit 307. The connection method setting unit 413 can set the connection method used in the handover in accordance with a user input. More specifically, when the user calls for setting of a connection method by the operation unit 305, the connection method setting unit 413 causes a setting screen (FIG. 5) to be displayed on the display unit 306, and the connection method designated by the user by the setting screen is stored in the RAM 303 as the connection method to be used in a handover.

The NFC control unit 412 writes the connection method to be used in the handover and the connection information relating to the connection method to an IC tag of the NFC communication unit 310. This is performed upon power supply activation of the image forming apparatus 140, or when the connection method to be used in the handover is changed. The connection information written by the NFC control unit 412 is information necessary for the information processing apparatus 130 to switch communication in the handover. In the present embodiment, connection information for when WiFi-Direct is set is, for example, a name of an access point for WiFi-Direct that the communication control unit 307 comprises. In addition, the connection information for when wireless LAN is set is, for example, the name of the access point 120 that the image forming apparatus 140 uses, an IP address of the image forming apparatus 140, or the like.

Note that, according to the present invention, a data format for when the NFC control unit 412 writes the connection method and the connection information to the IC tag may be any format to the extent that the spirit of the present invention is not impaired. For example, it may be a generic format such as NDEF (NFC Data Exchange Format), or it may be an independent format that is only accepted between the NFC control unit 402 and the NFC control unit 412. In the present embodiment, an independent format that writes the connection method and the connection information to a particular address of the IC tag is used.

<Setting Screen>

Figure 5:
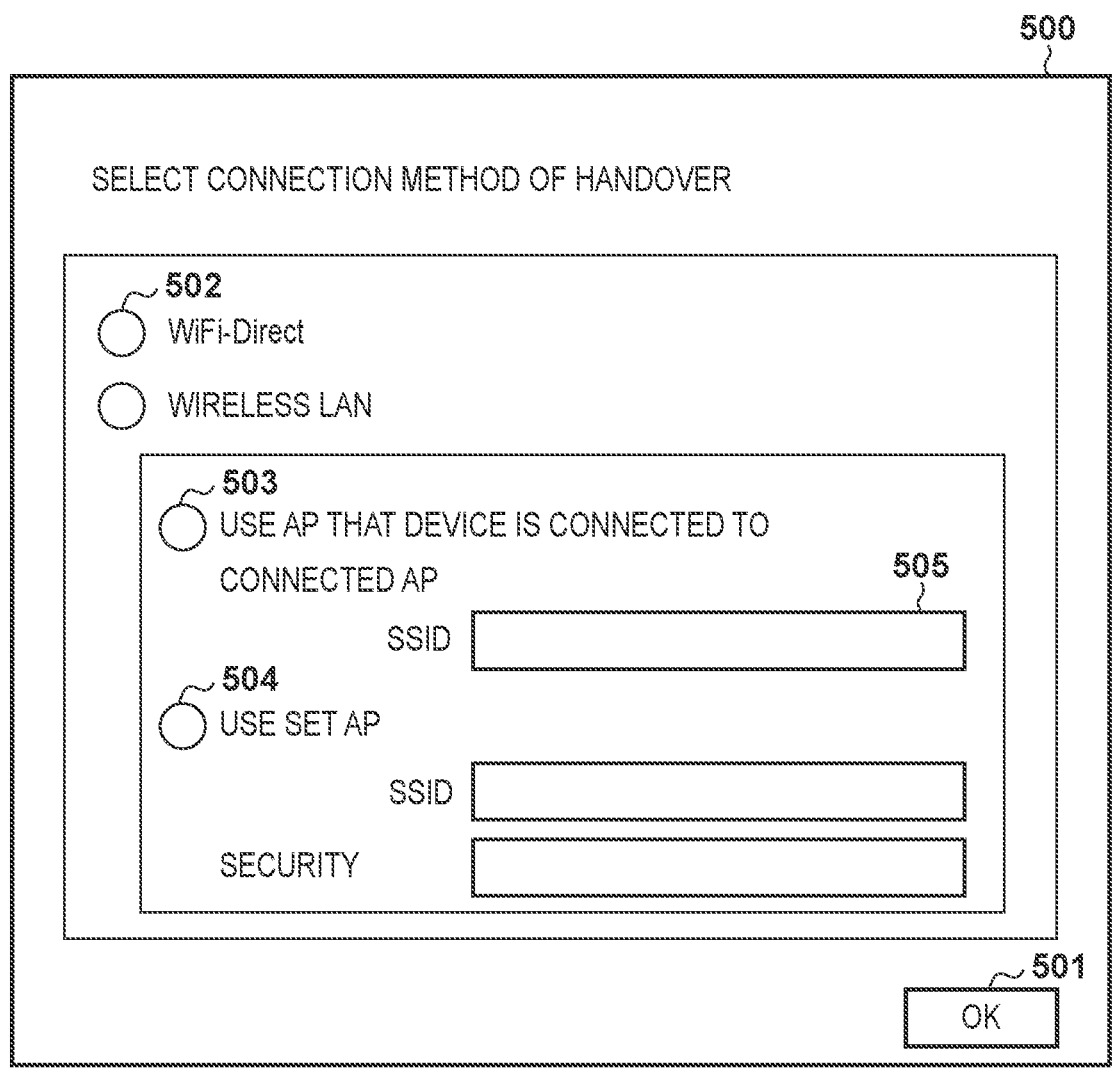
FIG. 5 is a view for illustrating an example of a screen for setting a connection method used by a handover according to the first embodiment.

Next, with reference to FIG. 5, explanation is given of a screen for setting the connection method used in the handover according to the present embodiment. A connection method setting screen 500 comprises an OK button 501, a connection method check-box 502, an AP setting check-box 503, a connected AP display box 504, and an AP input box 505.

The connection method check-box 502 displays on the display unit a UI for display control by which the user can select one connection method from usable connection methods. In the present embodiment, for the connection method check-box 502, it is possible to select WiFi-Direct and a wireless LAN. In other words, the user can select one of WiFi-Direct and wireless LAN as the connection method.

Figure 18:
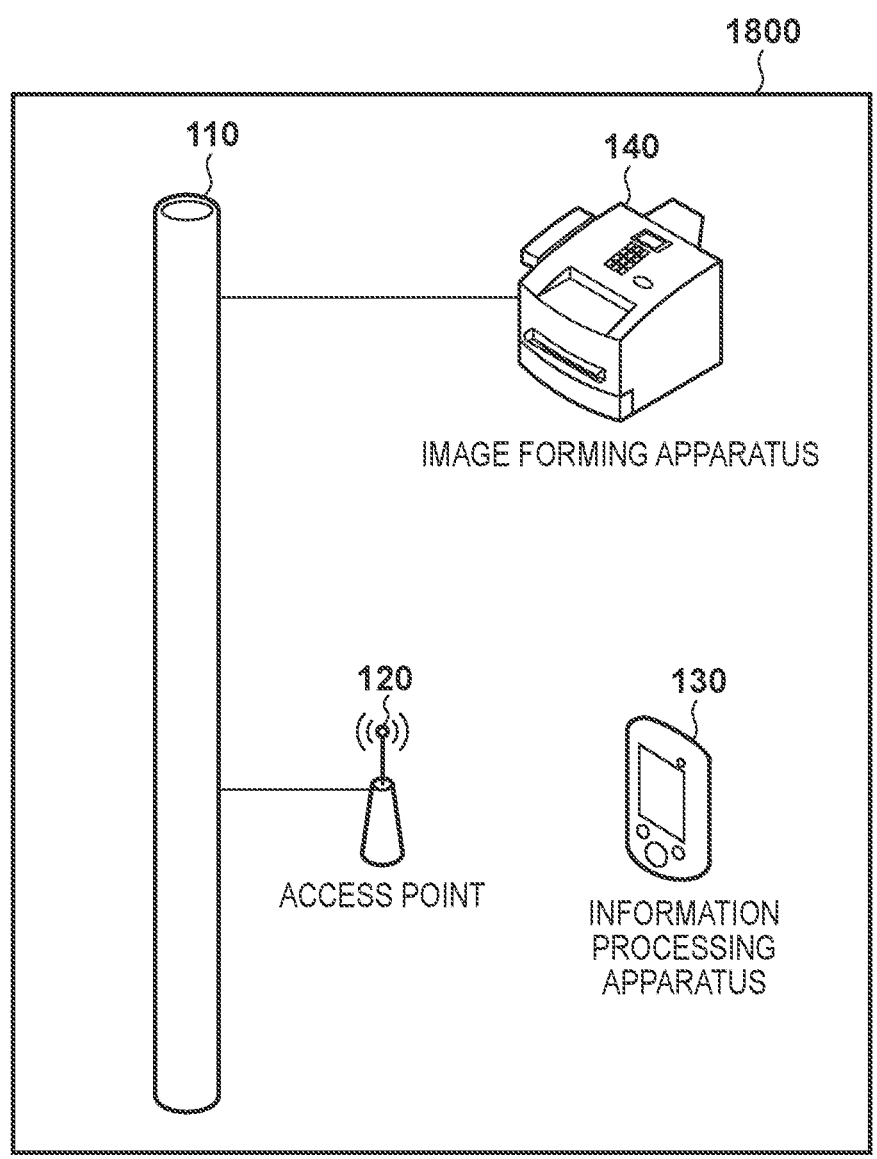
FIG. 18 is a schematic view illustrating a communication system 1800 when the image forming apparatus 140 is connected to a network 110 by wire.
Figure 19:
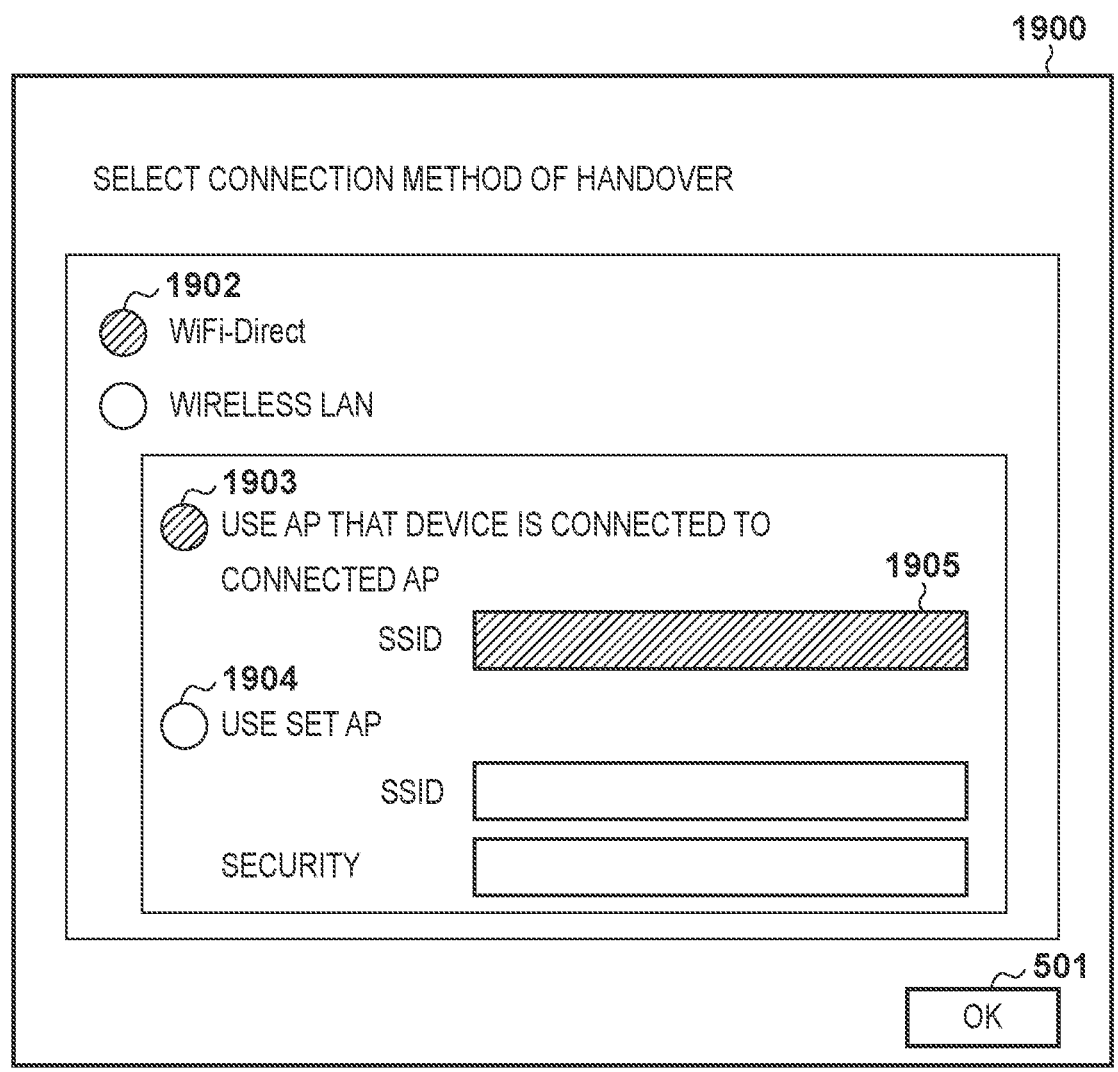
FIG. 19 is a view for illustrating an example of a setting screen of a connection method used by a handover in FIG. 18.

In the present embodiment, when WiFi-Direct of the image forming apparatus 140 cannot be used, the box for WiFi-Direct is displayed as grayed out and controlled to be unselectable, as illustrated by a connection method check-box 1902 of FIG. 19. Note that for FIG. 19, the image forming apparatus 140 illustrated in FIG. 18 does not have the wireless communication function, and illustrates a concrete example 1900 of the screen for setting the connection method in a communication system 1800 connected by wire to the network 110. A detailed explanation of FIG. 18 and FIG. 19 is similar to FIG. 1 and FIG. 5, and thus is omitted.

The AP setting check-boxes 503, 504 are settable when wireless LAN is selected via the connection method check-box 502, and provide a UI by which it is possible to select an AP setting method used upon a wireless LAN connection. Note that when the image forming apparatus 140 does not have AP information for connecting to the network 110, only the item 504 in which a user manually inputs the AP information is selectable. In a case such as when the image forming apparatus 140 is connected to the access point 120, and when the image forming apparatus 140 has AP information for connecting to the network 110, the item 503, which uses this information, is also selectable. When the image forming apparatus 140 has AP information for connecting to the network 110, this information is displayed on the AP display box 505 for the AP to which the image forming apparatus 140 is connected. In the present embodiment, it is possible to select whether to use the AP information that the image forming apparatus 140 is using, or to use AP information that the user inputs manually.

In the present embodiment, a case in which the image forming apparatus 140 does not have information of the access point 120, as in the communication system 1800 illustrated in FIG. 18, is envisioned. In this case, as illustrated by an AP setting check-box 1903 and a connected AP display box 1905 of FIG. 19, the setting to use the connected AP is displayed as gray-out, and controlled to be unselectable. In the case in which the user has selected to input the AP information via the AP setting check-box 503, the user inputs the AP information in the AP input box 505. By pressing the OK button 501, the user can instruct setting completion.

<Processing of the Image Forming Apparatus>

Figure 6:
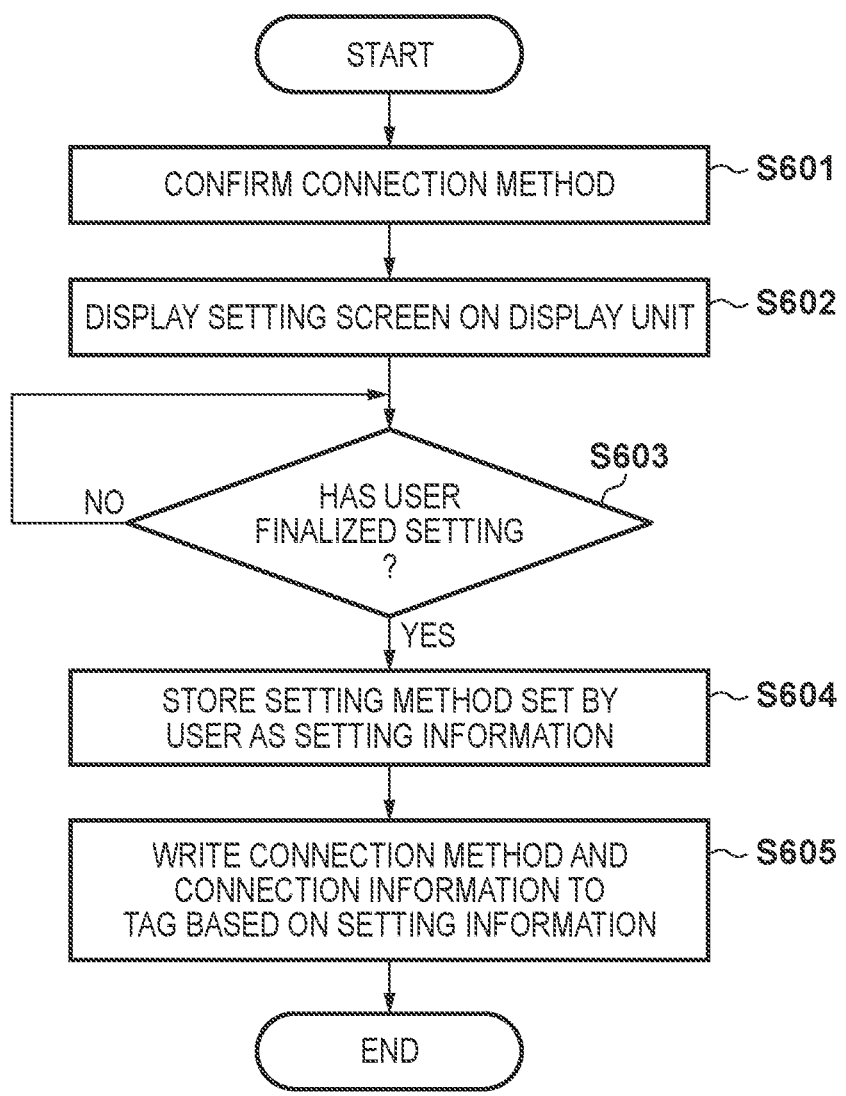
FIG. 6 is a flowchart that illustrates processing of a connection method setting unit 413 of the image forming apparatus 140 according to the first embodiment.

Next, with reference to FIG. 6, explanation is given for a processing procedure of the connection method setting unit 413 of the image forming apparatus 140 according to the present embodiment. This processing is started when a call for the setting screen of the connection method is instructed from the operation unit 305 of the image forming apparatus 140. Note that the processing explained below is realized by the system control unit 301 reading a control program stored in the ROM 302 or the external storage apparatus 309 into the RAM 302 and executing it.

In step S601, the connection method setting unit 413 refers to information that the communication control unit 307 has, confirms a connection method that can be used in a communication handover in a handover, and the processing transitions to step S602. In the present embodiment, of the connection methods that the communication control unit 307 supports, wireless LAN and WiFi-Direct are usable connection methods. Continuing on, in step S602, the connection method setting unit 413 displays the previously described setting screen of FIG. 5 on the display unit 306, and the processing transitions to step S603. In other words, here the connection methods that the communication control unit 307 supports are displayed on the setting screen as selectable.

In step S603, the connection method setting unit 413 determines whether the OK button 501, which means setting finalization, has been pressed. If not pressed, the determination of step S603 is repeated, and if pressed the processing transitions to step S604. In step S604, the connection method setting unit 413 stores in the RAM 303 the connection method input into the connection method setting screen 500 when the OK button 501 is pressed, as the connection method used in a handover. The processing then transitions to step S605. In step S605, the connection method setting unit 413 writes the connection method and the connection information to be used in a handover to the IC tag of the NFC communication unit 310, and the processing terminates.

<Processing of the Information Processing Apparatus>

Figure 7:
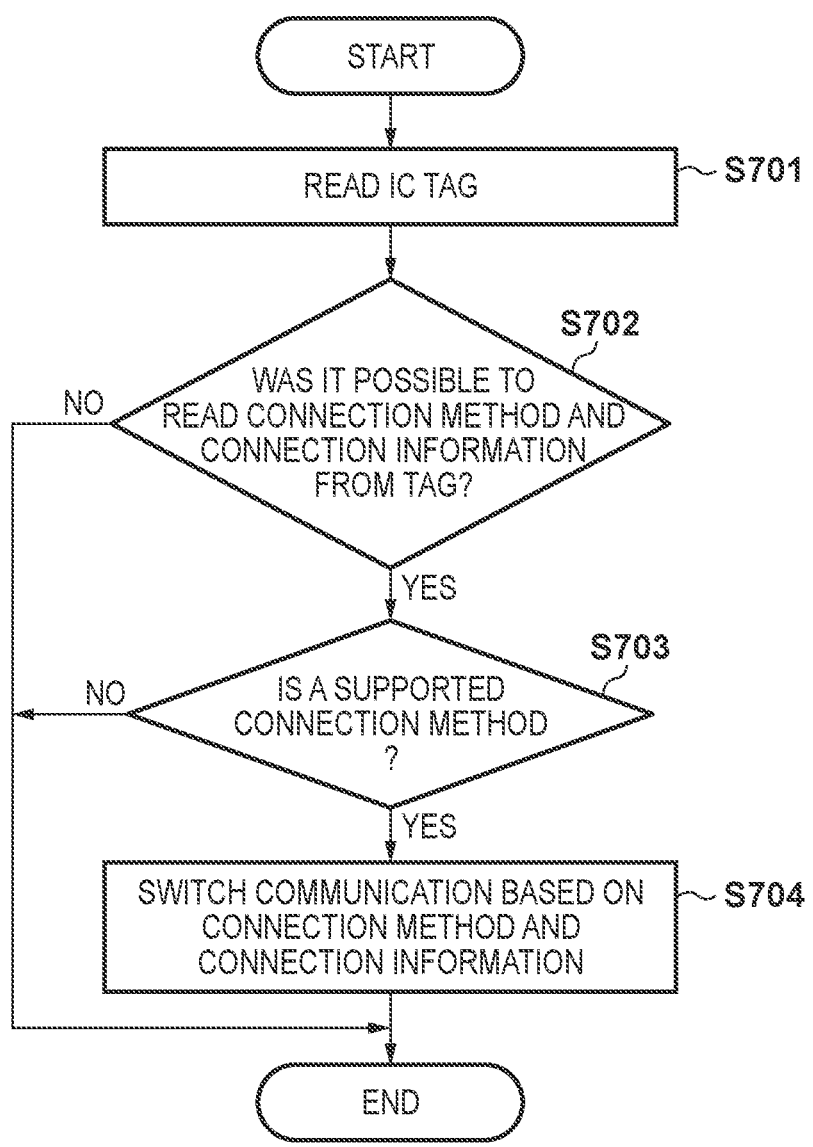
FIG. 7 is a flowchart illustrating processing concerning a communication handover in a handover of an NFC communication unit 213 of the information processing apparatus 130 according to the first embodiment.

Next, with reference to FIG. 7, explanation is given for a processing procedure regarding communication handover in a handover of the NFC communication unit 213 of the information processing apparatus 130 according to the present embodiment. This processing is started when the NFC communication unit 213 of the information processing apparatus 130 and the NFC communication unit 310 of the image forming apparatus 140 approach each other, and communication according to NFC starts. Note that the processing explained below is realized by the system control unit 201 reading the control program stored in the storage 207 and executing it.

In step S701, the application 400 performs reading of the IC tag of the NFC communication unit 310 via the NFC control unit 402. When the reading completes, the processing transitions to step S702. In step S702, the application 400 determines whether the connection method and the connection information for switching communication via the handover are in the data that was read. If the connection method and the connection information are present, transition is made to step S703. If not present, the handover is not performed, and this processing terminates.

In step S703, the application 400 determines whether the connection method read from the IC tag is a connection method supported by the communication unit 202. If the connection method is supported, transition is made to step S704; if not the handover is not performed and this processing terminates. In step S704, based on the connection method and the connection information read from the IC tag, the application 400 starts communication with the image forming apparatus 140 via the communication control unit 401, and switches communication from NFC to the connection method (executes the handover). In other words, here either a switch is made from NFC to communication in accordance with the wireless LAN or WiFi-Direct, or the processing terminates without switching the connection method from NFC. Subsequently this processing terminates.

As explained above, because the image forming apparatus according to the present embodiment can set the connection method that the communication is switched to by the handover, the user can use a connection method suitable to circumstances of the communication system 100.

Second Embodiment

Below, with reference to FIG. 8 through FIG. 10, explanation is given for a second embodiment of the present invention. The present embodiment differs from the above described first embodiment that prepares a screen for setting the connection method, and explanation is given for an example in which management information registered in advance and user information that is user input are used, and a connection method and connection information in accordance with the user information are written to the IC tag. Below, differences with the above described first embodiment are mainly explained, and explanation of portions that are similar to the above described first embodiment are omitted. An overview of the communication system according to the present embodiment is similar to FIG. 1, which is explained in the above described first embodiment. However, in the present embodiment the network 110 is a network to which only limited users have an access authority. The hardware configuration of the information processing apparatus 130 and the image forming apparatus 140 is similar to in the above described first embodiment, and so explanation thereof is omitted.

<Software Configuration>

Figures 8, 9:
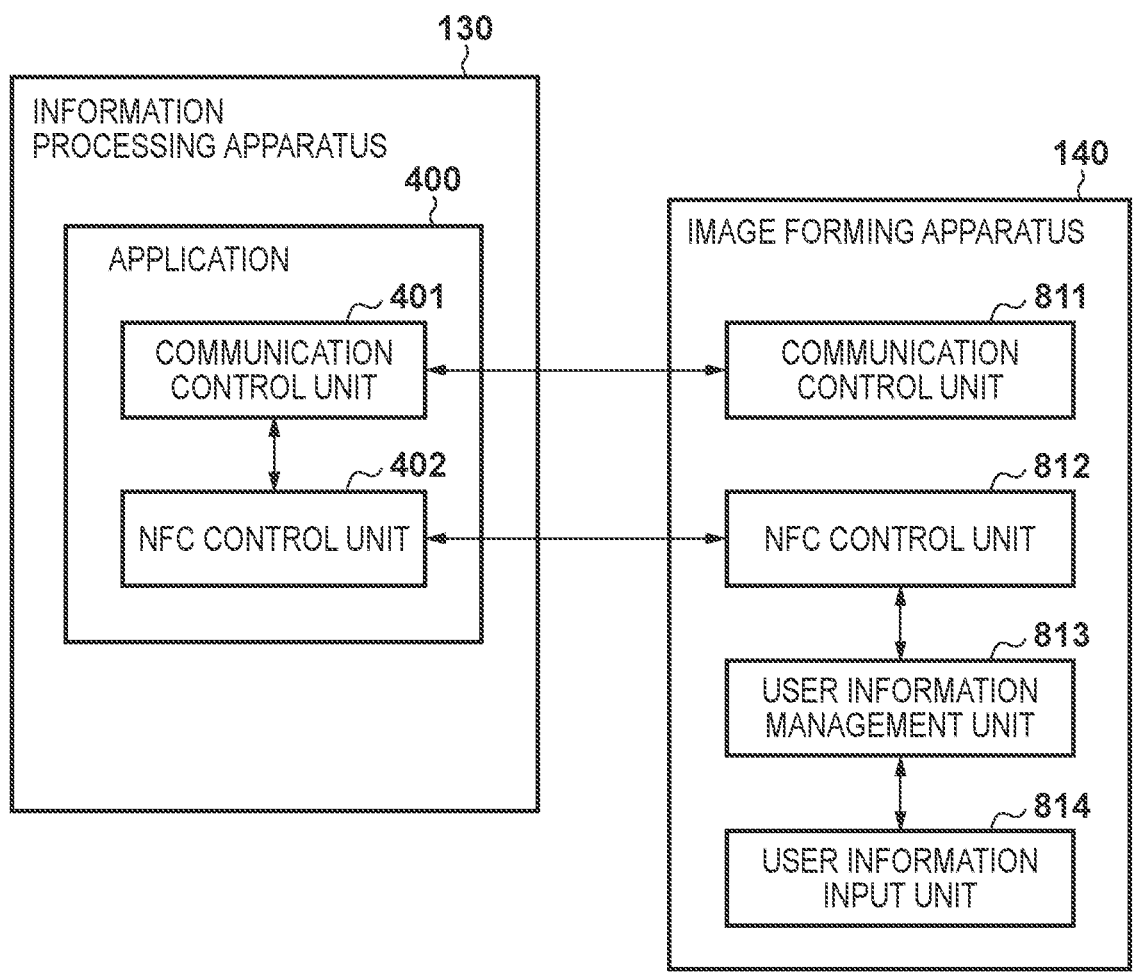
FIG. 8 is a block diagram for illustrating a software configuration of the communication system 100 according to a second embodiment.
FIG. 9 is a view for illustrating an example of management information held by a user information management unit 813 according to the second embodiment.

With reference to FIG. 8, explanation is given for a software configuration of the communication system 100 according to the present embodiment. The information processing apparatus 130 is similar to as in the above described first embodiment, so explanation thereof is omitted.

The image forming apparatus 140 comprises a communication control unit 811, an NFC control unit 812, a user information management unit 813, and a user information input unit 814. The communication control unit 811 performs communication with the communication control unit 401 via the communication control unit 307. The NFC control unit 812 receives a notification from the user information management unit 813 and writes to the IC tag of the NFC communication unit 310 the connection method to be used in a handover and the connection information relating to the connection method. Regarding writing to the IC tag, because it is similar to in the above described first embodiment, explanation thereof is omitted.

The user information input unit 814 displays on the display unit 306 a screen that prompts for user information input, and receives input of user information from the operation unit 305. When the user information input unit 814 receives input of user information, notifies the user information management unit 813. In the present embodiment, the user information is a user name. The user information management unit 813 has management information that links the user information and the connection method usable in handovers. The information may be stored in the RAM 303, or may be stored in an external storage apparatus of a server or the like via a network. In the present embodiment, of the connection methods that the communication control unit 307 supports, wireless LAN and WiFi-Direct are the connection methods usable in handovers.

In the present embodiment, the user information management unit 813 has the management information illustrated in FIG. 9, and it is stored in the RAM 303. The user information management unit 813 receives the notification of the user information from the user information input unit 814, compares it against the management information, and determines whether there is a privilege to access the network. The connection method to be used in a handover is selected in accordance with the result of this determination, and the selected connection method is notified to the NFC control unit 812. In the present embodiment, for users having authorization to access the network 110, the wireless LAN is selected as the connection method; for all other users, WiFi-Direct is selected.

<Management Information>

With reference to FIG. 9, explanation is given for an example of the management information that the user information management unit 813 has. In the present embodiment, user names and privileges to access the network 110 are linked and managed. In the example of FIG. 9, a user A has an access privilege, and the user B does not have an access privilege. Accordingly, wireless LAN is selected as the connection method for the user A, and WiFi-Direct is selected as the connection method for the user B.

<Processing of the Image Forming Apparatus>

Figure 10:
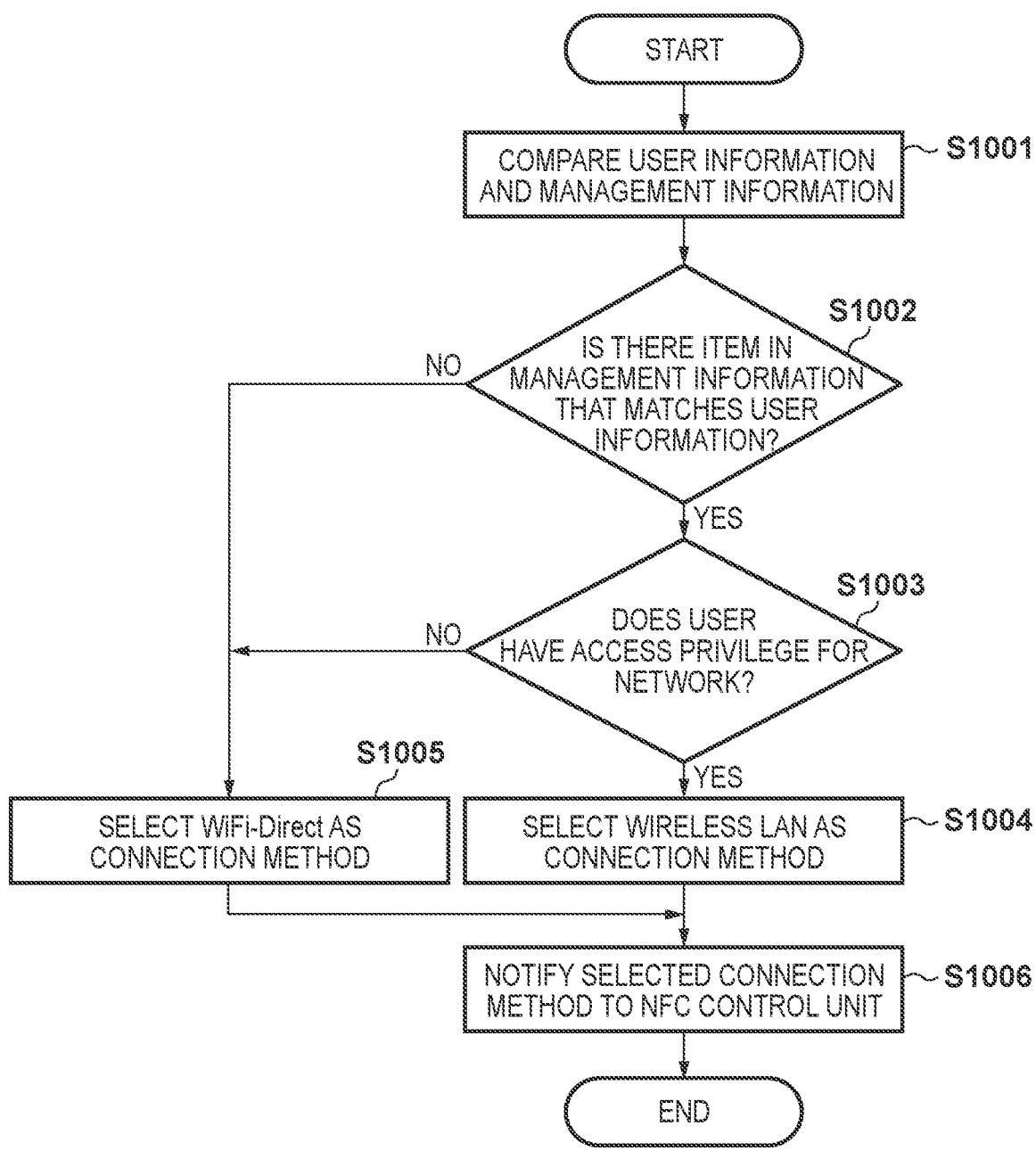
FIG. 10 is a flowchart that illustrates processing of the user information management unit 813 of the image forming apparatus 140 according to the second embodiment.

Next, with reference to FIG. 10, explanation is given for a processing procedure of the user information management unit 813 of the image forming apparatus 140 according to the present embodiment. This processing is started when the user information is notified from the user information input unit 814 to the user information management unit 813. Note that the processing explained below is realized by the system control unit 301 reading the control program stored in the ROM 302 or the external storage apparatus 309 into the RAM 203 and executing it.

In step S1001, the user information management unit 813 compares the user name included in the user information notified from the user information input unit 814 and the user names in the management information that the user information management unit 813 manages, and a transition is made to step S1002. In step S1002, the user information management unit 813 determines whether there is an item of having the same user name as the user name that is notified in the management information, based on the result of the comparing in step S1001. If present, transition is made to step S1003; if not present, transition is made to step S1005. For example, in a case of the present embodiment, if the notified user name is "user A" or "user B", it is determined that an item of the same user name is present in the management information; if the notified user name is "user C" then it is determined not to be present.

In step S1003, the user information management unit 813 refers to information of a network access privilege that is linked to the notified user name. If the access privilege is present transition is made to step S1004, if not present transition is made to step S1005. For example, in the case of the present embodiment, if the notified user name is "user A" then it is determined that the access privilege is present, and if it is "user B" then it is determined that the access privilege is not present.

In step S1004, the user information management unit 813 selects wireless LAN as the connection method, and transition is made to step S1006. In step S1005, the user information management unit 813 selects WiFi-Direct as the connection method, and transition is made to step S1006. In step S1006, the user information management unit 813 notifies the connection method selected in the previous step to the NFC control unit 812, and this processing terminates.

Note that, for the present embodiment, because there are two types of connection methods usable in handovers, the management information only manages the existence/absence of authorization regarding one of the connection methods, and the other connection method is used when the managed connection method cannot be used. However, the present invention is not limited to the case of two types of connection method as illustrated in the present embodiment, and the configuration of the management information and the processing of the user information management unit 813 may be appropriately changed within a scope in which the spirit of the present invention is not undermined.

As explained above, according to the present embodiment, it is possible to use a connection method suitable for each user as the connection method to which to switch communication in a handover.

Third Embodiment

Below, with reference to FIG. 11 through FIG. 12, explanation is given for a third embodiment of the present invention. The present embodiment differs from the above described first and second embodiments in that the information processing apparatus 130 notifies the connection method desired to be used in handovers to the image forming apparatus 140, and the image forming apparatus 140 writes connection information to the IC tag in accordance with the notified connection method. Below, differences with the above described first embodiment are mainly explained, and explanation of portions that are similar to the above described first embodiment are omitted. An overview of the communication system according to the present embodiment is similar to FIG. 1, which is explained in the above described first embodiment. The hardware configurations of the information processing apparatus 130 and the image forming apparatus 140 are similar to in the above described first embodiment, and so explanation thereof is omitted.

<Software Configuration>

Next, with reference to FIG. 11, explanation is given for a software configuration of the communication system 100 according to the present embodiment. The information processing apparatus 130 has an application 1100. The application 1100 is stored in the storage 207, and is executed by the system control unit 201 as necessary. The application 1100 comprises a communication control unit 1101, an NFC control unit 1102, and a connection method selection unit 1103. The connection method selection unit 1103 selects the connection method to use in a handover in accordance with a user input, and notifies the selected connection method to the image forming apparatus 140.

More specifically, the connection method selection unit 1103 has a list of the connection methods that can be used in the handover, and when the user instructs selection of the connection method to the application 1100, the list is displayed on the touch screen display 208. The list may be held in advance by the application 1100, or may be dynamically generated by the application 1100 referring to the connection methods that the information processing apparatus 130 or the image forming apparatus 140 support. In the present embodiment, the above described list is something that the application 1100 has in advance, and wireless LAN and WiFi-Direct are included as items in the list.

The connection method selection unit 1103 notifies the connection method that the user selected from the displayed connection methods to the image forming apparatus 140 via the NFC control unit 1102. In the present embodiment, the notification of the connection method is assumed to be writing information of the connection method to a particular address of the IC tag of the NFC communication unit 310. The NFC control unit 1102 uses the NFC communication unit 213 to perform communication with the NFC communication unit 310 of the image forming apparatus 140. In the present embodiment, by performing communication with the NFC communication unit 310, the NFC control unit 1102 performs notification of the connection method and obtaining of the connection information.

The communication control unit 1101 performs communication, via the communication unit 202, with a communication control unit 1111, based on the connection information that the NFC control unit 1102 obtained. The image forming apparatus 140 comprises the communication control unit 1111 and an NFC control unit 1112. The communication control unit 1111 performs communication with the communication control unit 1101 via the communication control unit 307. The NFC control unit 1112 periodically refers to the NFC communication unit 310, and confirms whether the connection method has been notified from the NFC control unit 1102.

In the present embodiment, confirmation of notification of the connection method is assumed to be confirmation as to whether there is a change to information that indicates the connection method and is written to a particular address of an IC tag of the NFC communication unit 310. Furthermore the NFC control unit 1112 confirms whether the notified connection method can be supported by the image forming apparatus 140, and if determined to be supportable, the connection information regarding the connection method is written to the IC tag of the NFC communication unit 310. In the present embodiment, if the notified connection method is present among network connection methods that are supported by the communication control unit 307, the NFC control unit 1112 determines that it can be supported.

<Processing of the Image Forming Apparatus>

Figure 12:
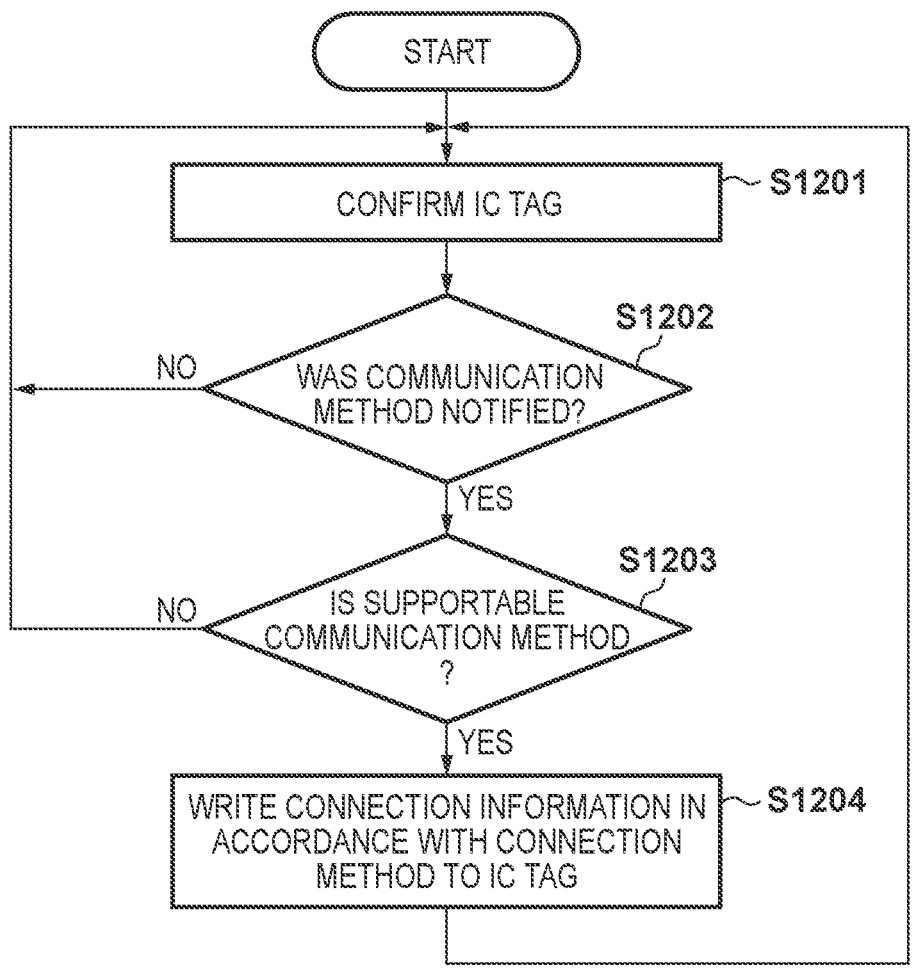
FIG. 12 is a flowchart that illustrates processing of an NFC control unit 1112 of the image forming apparatus 140 according to the third embodiment.

Next, with reference to FIG. 12, explanation is given for a processing procedure of the NFC control unit 1112 of the image forming apparatus 140 according to the present embodiment. This processing is started upon a power supply activation of the image forming apparatus 140. During operation of the image forming apparatus 140, this processing is continuously performed. Note that the processing explained below is realized by the system control unit 301 reading a control program stored in the ROM 302 or the external storage apparatus 309 into the RAM 203 and executing it.

In step S1201, the NFC control unit 1112 confirms the IC tag to determine whether notification of the connection method has been performed. The processing then transitions to step S1202. In step S1202, the NFC control unit 1112 determines whether notification of the connection method has been performed. If the notification has been performed transition is made to step S1203; if there is no notification, transition is made to step S1201.

In step S1203, the NFC control unit 1112 determines whether the image forming apparatus 140 can support the notified connection method. If it can be supported transition is made to step S1204; if it cannot be supported, transition is made to step S1201. In the present embodiment, as described in the explanation of the NFC control unit 1112 of FIG. 11, if a connection method that the communication control unit 307 supports is notified, then it is supportable. In step S1204, the NFC control unit 1112 writes connection information corresponding to the connection method to the IC tag, and transition is made to step S1201. Regarding writing to the IC tag, because it is similar to in the above described first embodiment, explanation thereof is omitted.

As explained above, according to the present embodiment, by the information processing apparatus 130 instructing a connection method to be used in the handover, it is possible to use a connection method suited to the user of the information processing apparatus 130.

Fourth Embodiment

Below, with reference to FIG. 13 through FIG. 15, explanation is given for a fourth embodiment of the present invention. The present embodiment differs to the above described first through third embodiments, and a connection method suited to the circumstances is automatically selected from connection methods that the image forming apparatus 140 supports. More specifically, when a notification that communication has terminated is received, control is performed so as to select by default WiFi-Direct by which communication is possible even without an access privilege, and control is performed to switch the connection method when communication by another connection method is requested. Below, differences with the above described first embodiment are mainly explained, and explanation of portions that are similar to the above described first embodiment are omitted.

<System Configuration>

Figure 13:
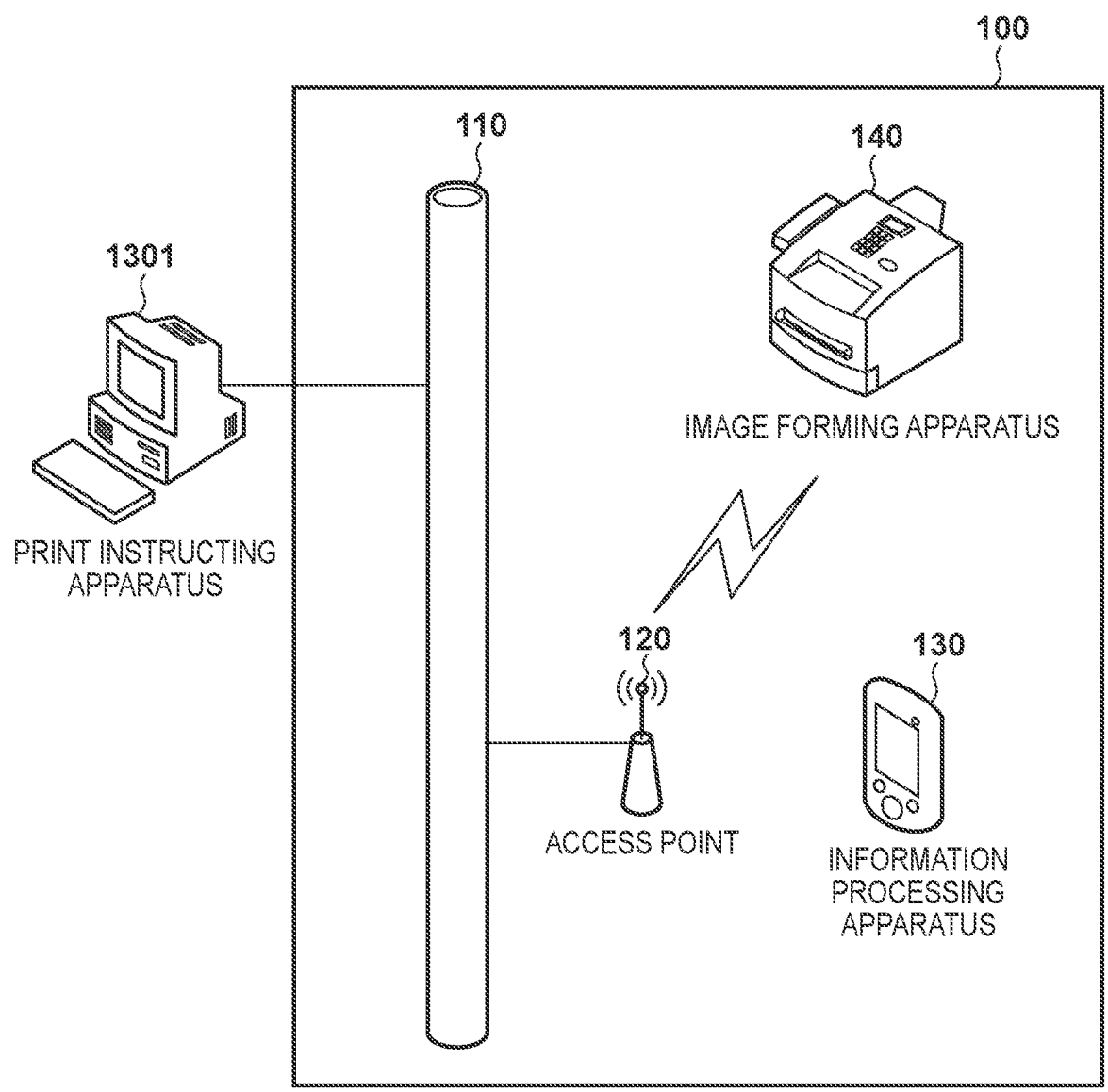
FIG. 13 is a schematic view that illustrates the communication system according to a fourth embodiment.

Firstly, referring to FIG. 13, explanation is given of the communication system according to the present embodiment. Reference numeral 100 in the drawing is the communication system, which is comprised of the network 110, the access point 120, the information processing apparatus 130, and the image forming apparatus 140. Because the network 110, the access point 120, the information processing apparatus 130, and the image forming apparatus 140 are similar to in the above described first embodiment, explanation thereof is omitted. A print instructing apparatus 1301 is connected via the network 110 so that it is able to communicate with the image forming apparatus 140, and transmits print data to the image forming apparatus 140 in accordance with an operation of a user.

The hardware configurations of the information processing apparatus 130 and the image forming apparatus 140 are similar to in the above described first embodiment, and so explanation thereof is omitted. However, when the communication control unit 307 in the present embodiment uses one of the supported network connection methods to perform communication, another network connection method cannot be used.

<Software Configuration>

Next, with reference to FIG. 14, explanation is given for a software configuration of the communication system 100 according to the present embodiment. The information processing apparatus 130 has the application 400. The application 400 comprises the communication control unit 401 and the NFC control unit 402. Because the application 400, the communication control unit 401, and the NFC control unit 402 are similar to in the above described first embodiment, explanation thereof is omitted.

The image forming apparatus 140 comprises a communication control unit 1411 and an NFC control unit 1412. The communication control unit 1411 performs communication with the communication control unit 401 or the print instructing apparatus 1301 via the communication control unit 307. When starting communication, the communication control unit 1411 notifies the connection method to be used to the NFC control unit 1412. When communication terminates, the communication control unit 1411 notifies communication termination to the NFC control unit 1412. The NFC control unit 1412 receives the notification of the connection method from the communication control unit 1411, selects the connection method most suited to be used in a handover, and writes the selected connection method and the connection information to the IC tag of the NFC communication unit 310.

In the present embodiment, the NFC control unit 1412 selects, from the connection methods that the communication control unit 307 supports, the connection method for no inconvenience occurs when using the connection method and furthermore has the highest possibility that the user of the information processing apparatus 130 can use it when it is used in a handover. In other words, the NFC control unit 1412 normally selects WiFi-Direct, which is capable of communication even when the user does not have a privilege to access the network 110 of the information processing apparatus 130 Accordingly, when a simple termination of communication is received, WiFi-Direct is selected. However, only when a connection by wireless LAN is notified from the communication control unit 1411, wireless LAN is selected to avoid interrupting wireless LAN communication for communication that is in progress currently, by using WiFi-Direct in a handover. In other words, if connection by wireless LAN is notified from the communication control unit 1411, for example circumstances in which wireless LAN communication is currently being performing are envisioned, and maintaining that connection method is envisioned. In this way, by virtue of the present invention, the image forming apparatus 140 selects the connection method according to the current communication circumstances.

<Processing of the Image Forming Apparatus>

Figure 15:
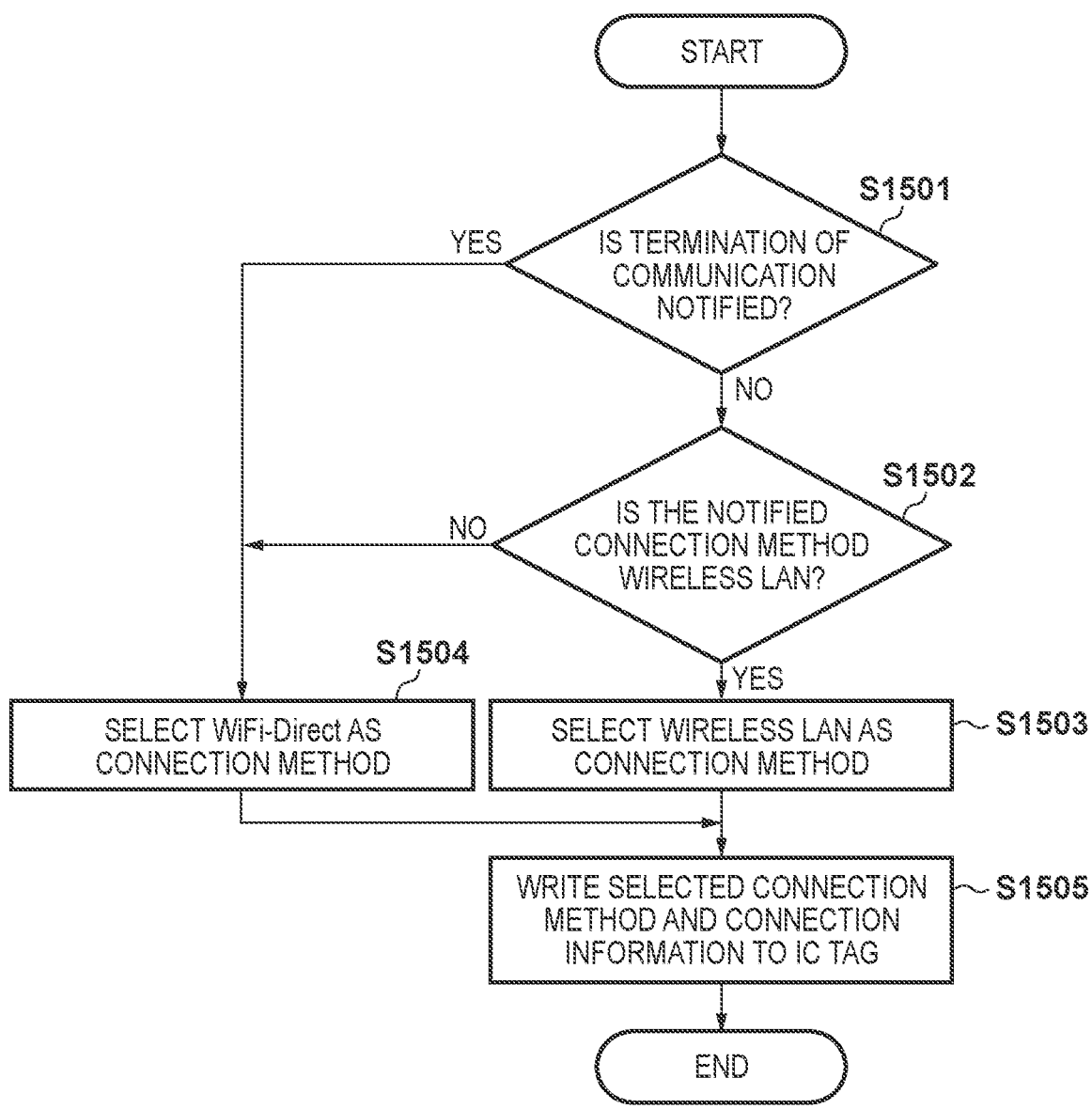
FIG. 15 is a flowchart that illustrates processing of an NFC control unit 1412 of the image forming apparatus 140 according to the fourth embodiment.

Next, with reference to FIG. 15, explanation is given for a processing procedure of the NFC control unit 1412 of the image forming apparatus 140 according to the present embodiment. This processing is started when a notification of the connection method is received from the communication control unit 1411. Note that the processing explained below is realized by the system control unit 301 reading a control program stored in the ROM 302 or the external storage apparatus 309 into the RAM 203 and executing it.

In step S1501, the communication control unit 1411 determines whether the received notification is a termination of communication. If it is a communication termination, transition is made to step S1504; otherwise, transition is made to step S1502. In step S1502, the communication control unit 1411 determines whether the notified connection method is wireless LAN. If it is wireless LAN, transition is made to step S1503; otherwise, transition is made to step S1504. In step S1503, the communication control unit 1411 selects wireless LAN as the connection method, and transition is made to step S1505.

Meanwhile, in step S1504 the communication control unit 1411 selects WiFi-Direct as the connection method, and transition is made to step S1505. In step S1505, the communication control unit 1411 writes the connection method selected in the previous step (step S1503 or step S1504) and the connection information corresponding to the connection method to the IC tag. Regarding details of the writing to the IC tag, because it is similar to in the above described first embodiment, explanation thereof is omitted.

As explained above, by virtue of the present embodiment, it is possible for the information processing apparatus 130 to normally use in a handover the connection method most likely to be usable, but to use another connection method to avoid inconvenience if inconvenience occurs due to using the connection method.

Fifth Embodiment

Below, with reference to FIG. 16 and FIG. 17, explanation is given for a fifth embodiment of the present invention. The present embodiment is a variation of the above-described first through fourth embodiments, and selects a replacement connection method from usable connection methods if a connection method that the communication control unit 307 supports cannot be used for any reason. In the present embodiment, differences with the above described first embodiment are recited as a focus, and explanation of portions that are similar to the above described first embodiment are omitted. A schematic view of the communication system according to the present embodiment is illustrated in FIG. 1, similarly to in the above described first embodiment. The hardware configurations of the information processing apparatus 130 and the image forming apparatus 140 are similar to in the above described first embodiment, and so explanation thereof is omitted.

<Software Configuration>

Figure 16:
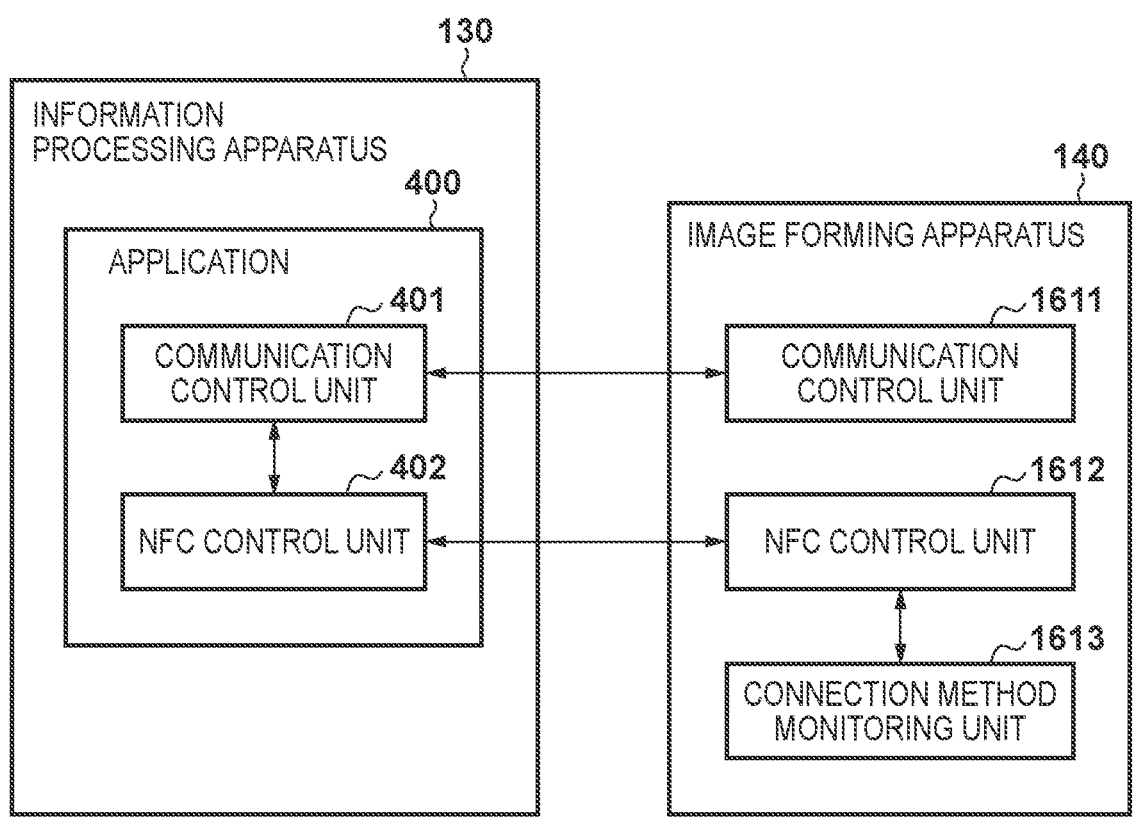
FIG. 16 is a block diagram for illustrating a software configuration of the communication system 100 according to a fifth embodiment.

Next, with reference to FIG. 16, explanation is given for a software configuration of the communication system 100 according to the present embodiment. The information processing apparatus 130 has the application 400. The application 400 comprises the communication control unit 401 and the NFC control unit 402. Because the application 400, the communication control unit 401, and the NFC control unit 402 are similar to in the above described first embodiment, explanation thereof is omitted. The image forming apparatus 140 comprises a communication control unit 1611, an NFC control unit 1612, and a connection method monitoring unit 1613.

The connection method monitoring unit 1613 uses the communication control unit 307 to monitor whether the connection methods that the communication control unit 307 supports are in a usable state. More specifically, a connection state with a connector or the access point 120, the validity/invalidity of a function in a device setting of the image forming apparatus 140, or the like is constantly monitored. For example, if a LAN cable is detached from the connector, wired LAN is unusable, if the connection with the access point 120 is cut wireless LAN is unusable, and if WiFi-Direct becomes inactive in device settings of the image forming apparatus 140, WiFi-Direct is unusable. If there is a change in the connection method usable state, the connection method monitoring unit 1613 notifies this to the NFC control unit 1612. The communication control unit 1611 performs communication with the communication control unit 401 via the communication control unit 307. The NFC control unit 1612 writes the connection method to be used in the handover and the connection information relating to the connection method to the IC tag of the NFC communication unit 310.

Upon receiving the notification from the connection method monitoring unit 1613, the NFC control unit 1612 confirms whether the connection method selected as the connection method to be used in the handover is unusable. If it is unusable, it is displayed that the selected connection method is unusable on the display unit 306, a suitable connection method is re-selected from the usable connection methods as necessary, and the connection method and the connection information are written to the IC tag. If no usable connection method remains, the NFC control unit 1612 deletes the connection method and the connection information from the IC tag. In the present embodiment, the two connection methods that can be used in a handover, out of connection methods that the communication control unit 307 supports, are wireless LAN and WiFi-Direct. Accordingly, in a case where either becomes unusable, the other is re-selected as the connection method if it is usable.

<Processing of the Image Forming Apparatus>

Figure 17:
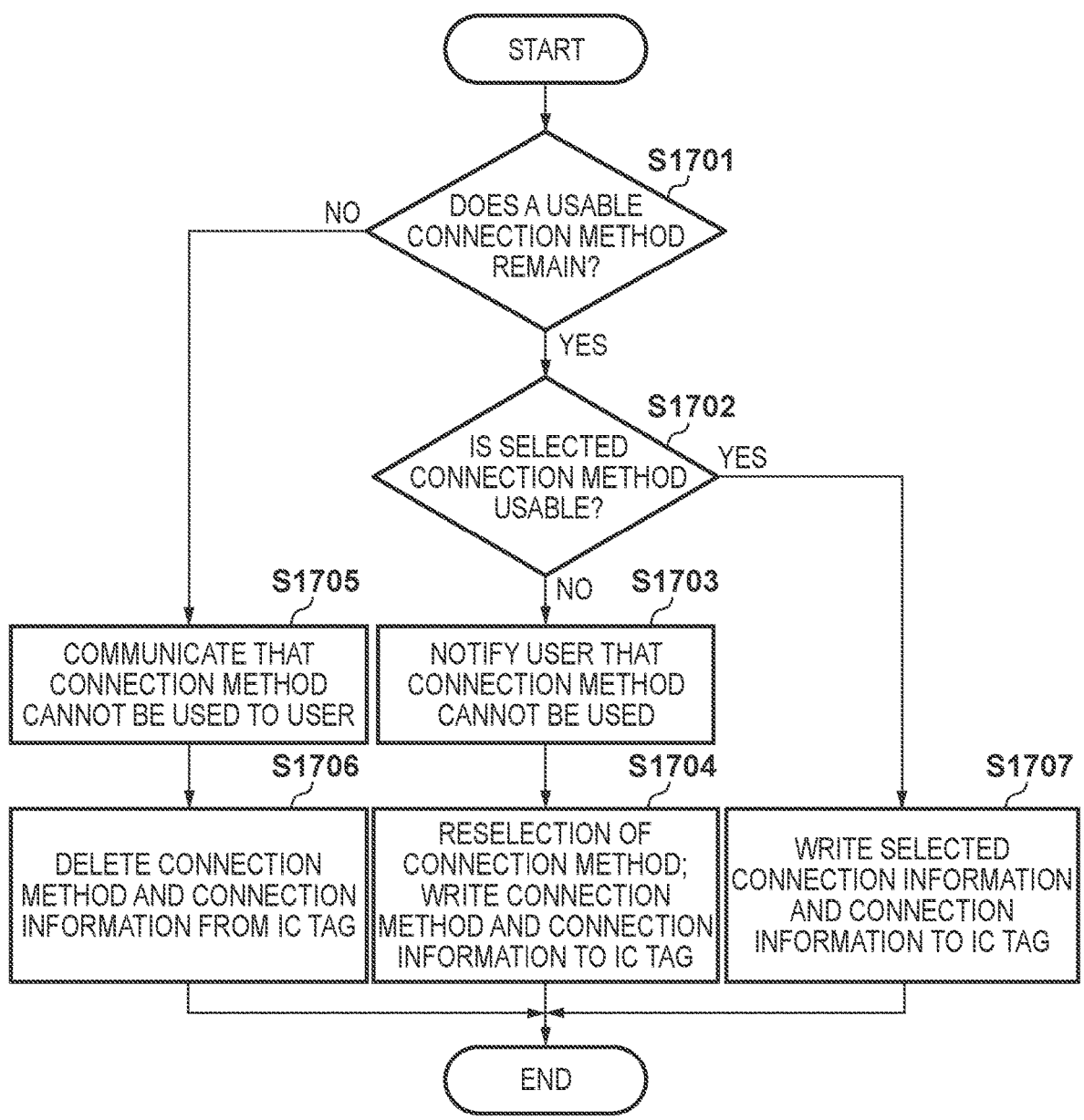
FIG. 17 is a flowchart that illustrates processing of an NFC control unit 1612 of the image forming apparatus 140 according to the fifth embodiment.

Next, with reference to FIG. 17, explanation is given for a processing procedure of the NFC control unit 1612 of the image forming apparatus 140 according to the present embodiment. This processing is started when notification of the usable state is received from the connection method monitoring unit 1613. Note that the processing explained below is realized by the system control unit 301 reading the control program stored in the ROM 302 or the external storage apparatus 309 into the RAM 203 and executing it.

In step S1701, the connection method monitoring unit 1613 determines whether it has been notified that all connection methods are unusable. If all are unusable transition is made to step S1705, otherwise transition is made to step S1702. In step S1702, the connection method monitoring unit 1613 confirms whether it has been notified that the selected connection method is unusable. If it is unusable, transition is made to step S1703; if it is usable, transition is made to step S1707. Note that the selected connection method is the connection method selected in the above-described first through fourth embodiments, and differs to the connection method to be re-selected in step S1704 which is explained later.

In step S1703, the connection method monitoring unit 1613 displays on the display unit 306 to the effect that the selected connection method cannot be used. The processing then transitions to step S1704. In step S1704, the connection method monitoring unit 1613 re-selects the connection method and stores it in the ROM 302. The connection information corresponding to the re-selected connection method is then written to the IC tag, and this processing terminates. In the present embodiment, this step is taken when, out of the wireless LAN and WiFi-Direct, one selected as the connection method becomes unusable and the other is usable. Accordingly, in this step the usable one is re-selected as the connection method, and the re-selected connection method and the connection information are written to the IC tag.

In step S1705, the connection method monitoring unit 1613 displays on the display unit 306 to the effect that the selected connection method cannot be used, and transition is made to step S1706. In step S1706, because the handover cannot be performed, the connection method monitoring unit 1613 deletes the connection method and the connection information from the IC tag. Subsequently this processing terminates. Meanwhile, in step S1707, the connection method monitoring unit 1613 re-selects the connection method, writes the connection method and the connection information to the IC tag, and this processing terminates.

As explained above, by virtue of the present embodiment, it is possible to use a suitable connection method to perform a handover even when a connection method of the image forming apparatus 140 cannot be used.

Other Embodiments

The present invention is not limited to the embodiments described above, and various modifications are possible. For example, a case in which the image forming apparatus 140 is connected to the network 110 and the wired LAN without passing through the access point 120, as in the communication system 1800 illustrated in FIG. 18, can be considered. In such a case, the image forming apparatus 140 can use the wired LAN instead of the wireless LAN as the connection method used in the handover. However, even when the wired LAN is used as the connection method used in the handover, because the information processing apparatus 130 connects to the network 110 by wireless communication, it is necessary to write information of the access point 120 that is connected to the network 110 as the connection information. However, because the image forming apparatus 140 is connected to the network 110 by wire without passing through the access point 120, it is not possible to obtain the information of the access point 120 from a network setting of the image forming apparatus 140.

Accordingly, in the present embodiment, a configuration is provided whereby, when the image forming apparatus 140 is connected to the network 110 by the wired LAN, the information of the access point used as the connection information is set in the image forming apparatus 140. More specifically, in a case where the user has instructed, from the operation unit 305, a setting of the access point for the handover, the image processing apparatus 130 displays an access point information input screen on the display unit 306, and receives input of access point information from the user. When the wired LAN is used in the handover, the image forming apparatus 140 uses the access point information input from the user as the connection information. Note that the access point information input screen may be just a screen for inputting the access point, or, for example, may enable input as a part of the connection method selection as illustrated in FIG. 5 or FIG. 19.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-232939 filed on Nov. 17, 2014, which is hereby incorporated by reference herein in its entirety.

What is claimed is:

1. A data communication apparatus which is connectable with a short-range wireless communicator configured to execute short-range wireless communication, comprising:
   an operation device that receives, from a user, a setting of enabling a predetermined wireless communication and an SSID for the predetermined wireless communication; and
   a controller that is capable of writing the SSID received by the operation device into the short-range wireless communicator while the predetermined wireless communication mode is enabled,
   wherein the controller is not capable of writing the SSID into the short-range wireless communicator while the predetermined wireless communication mode is not enabled.

2. The data communication apparatus according to claim 1, wherein
   the controller is capable of writing the SSID and address information of the data communication apparatus into the short-range wireless communicator while the predetermined wireless communcation mode is enabled.

3. The data communication apparatus according to claim 1, wherein
   the SSID is used for a wireless communication which is different from the short-range wireless communication.

4. The data communication apparatus according to claim 1, further comprising
   a scanner that scans a document.

5. The data communication apparatus according to claim 1, further comprising
   a printer that prints an image.

6. The data communication apparatus according to claim 1, wherein
   the short-range wireless communicator is an NFC communicator.

7. The data communication apparatus according to claim 1, wherein the controller writes the SSID received by the operation device into the short-range wireless communicator based on a user instruction of enabling of the predetermined wireless communication mode.

8. The data communication apparatus according to claim 1, wherein the short-range wireless communication is executed by approaching of an information processing apparatus and the SSID is transmitted by the short-range wireless communication.

9. The data communication apparatus according to claim 1, wherein the data communication apparatus comprises the short-range wireless communicator.

10. A control method for controlling data communication apparatus which is connectable with a short-range wireless communicator configured to execute short-range wireless communication, the control method comprising:
    receiving, from a user and by an operation device of the data communication apparatus, a setting of enabling a predetermined wireless communication and an SSID for the predetermined wireless communication;
    writing the SSID received by the operation device into the short-range wireless communicator while the predetermined wireless communication mode is enabled; and
    not writing the SSID into the short-range wireless communicator while the predetermined wireless communication mode is not enabled.

11. A non-transitory computer-readable storage medium storing a program for causing a computer to execute each step of a control method for controlling data communication apparatus which is connectable with a short-range wireless communicator configured to execute short-range wireless communication, the control method comprising:
    receiving, from a user and by an operation device of the data communication apparatus, a setting of enabling a predetermined wireless communication and an SSID for the predetermined wireless communication;
    writing the SSID received by the operation device into the short-range wireless communicator while the predetermined wireless communication mode is enabled; and
    not writing the SSID into the short-range wireless communicator while the predetermined wireless communication mode is not enabled.

12. A data communication apparatus which is connectable with a short-range wireless communicator configured to execute short-range wireless communication, comprising:
    an operation device that receives, from a user, a setting of enabling a predetermined wireless communication and an SSID for the predetermined wireless communication, wherein the short-range wireless communicator is capable of transmitting the SSID received by the operation device to an information processing apparatus by the short-range wireless communication while the predetermined wireless communication mode is enabled, and wherein the short-range wireless communicator is not capable of transmitting the SSID to the information processing apparatus by the short-range wireless communication while the predetermined wireless communication mode is not enabled.

13. The data communication apparatus according to claim 12, wherein the short-range wireless communicator is capable of transmitting the SSID and address information of the data communication apparatus to the information processing apparatus by the short-range wireless communication while the predetermined wireless communication mode is enabled.

14. The data communication apparatus according to claim 12, wherein the SSID is used for a wireless communication which is different from the short-range wireless communication and is performed with the information processing apparatus.

15. The data communication apparatus according to claim 12, wherein the short-range wireless communicator does not transmit the SSID by not writing the SSID into the short-range wireless communicator while the predetermined wireless communication mode is not enabled.

16. The data communication apparatus according to claim 12, further comprising a scanner that scans a document.

17. The data communication apparatus according to claim 12, further comprising a printer that prints an image.

18. The data communication apparatus according to claim 12, wherein the short-range wireless communicator is an NFC communicator.

19. The data communication apparatus according to claim 12, wherein the short-range wireless communicator is capable of transmitting the SSID received by the operation device to an information processing apparatus by the short-range wireless communication while the predetermined wireless communication mode is enabled.

20. The data communication apparatus according to claim 12, wherein the data communication apparatus comprises the short-range wireless communicator.

21. A multifunction device which is connectable with a short-range wireless communicator configured to execute short-range wireless communication, comprising:

a scanner that scans a document;
a printer that prints an image;
an operation device that receives, from a user, an SSID for the predetermined wireless communication; and
a controller that is capable of writing the SSID received by the operation device into the short-range wireless communicator, the SSID being transmittable by the short-range wireless communicator to a mobile terminal.

22. The multifunction device according to claim 21, wherein the controller is capable of writing the SSID and address information of the data communication apparatus into the short-range wireless communicator.

23. The multifunction device according to claim 21, wherein the SSID is used for a wireless communication which is different from the short-range wireless communication.

24. The multifunction device according to claim 21, wherein the short-range wireless communicator is an NFC communicator.

25. The multifunction device according to claim 21, wherein the controller writes the SSID received by the operation device into the short-range wireless communicator based on a user instruction of enabling of a predetermined wireless communication mode.

26. The multifunction device according to claim 21, wherein the short-range wireless communication is executed by approaching of the mobile terminal and the SSID is transmitted by the short-range wireless communication.

27. The multifunction device according to claim 21, wherein the multifunction device comprises the short-range wireless communicator.

* * * * *